(12) United States Patent
Miyake et al.

(10) Patent No.: US 8,774,603 B2
(45) Date of Patent: Jul. 8, 2014

(54) INFORMATION PROCESSING APPARATUS, INFORMATION PROCESSING METHOD, PROGRAM, AND RECORDING MEDIUM

(75) Inventors: Toru Miyake, Tokyo (JP); Kei Hiraizumi, Kanagawa (JP); Yoshinori Takagi, Kanagawa (JP); Masato Akao, Kanagawa (JP); Yasunobu Node, Tokyo (JP); Yoshihito Fujiwara, Kanagawa (JP); Kazutaka Ando, Kanagawa (JP); Naoki Kobayashi, Tokyo (JP); Michimasa Obana, Tokyo (JP); Yoshihiro Takahashi, Chiba (JP); Takeyuki Fujii, Tokyo (JP); Masanori Machimura, Tokyo (JP); Toru Nakagawa, Tokyo (JP); Yusuke Kajio, Tokyo (JP); Yasuhiro Fujimori, Kanagawa (JP); Tetsujiro Kondo, Tokyo (JP)

(73) Assignee: Sony Corporation, Tokyo (JP)

( * ) Notice: Subject to any disclaimer, the term of this patent is extended or adjusted under 35 U.S.C. 154(b) by 1202 days.

(21) Appl. No.: 12/127,269

(22) Filed: May 27, 2008

(65) Prior Publication Data

US 2008/0310764 A1    Dec. 18, 2008

(30) Foreign Application Priority Data

Jun. 13, 2007  (JP) .................................. 2007-155938

(51) Int. Cl.
*H04N 5/761*    (2006.01)
(52) U.S. Cl.
USPC .......................................... 386/282; 386/278

(58) Field of Classification Search
None
See application file for complete search history.

(56) References Cited

U.S. PATENT DOCUMENTS

| | | | | |
|---|---|---|---|---|
| 5,309,559 A | * | 5/1994 | Sato et al. | 345/522 |
| 2007/0064279 A1 | * | 3/2007 | Nishida | 358/462 |
| 2007/0071289 A1 | * | 3/2007 | Takeguchi et al. | 382/118 |

FOREIGN PATENT DOCUMENTS

| | | |
|---|---|---|
| JP | 2001-211427 | 8/2001 |
| JP | 2004-172671 | 6/2004 |
| JP | 2004-282296 | 10/2004 |
| JP | 2004-357239 | 12/2004 |
| JP | 2006-270187 | 10/2006 |
| JP | 2007-20029 | 1/2007 |

OTHER PUBLICATIONS

Office Action issued May 31, 2011 in Japanese Patent Application No. 2007-155938.

* cited by examiner

*Primary Examiner* — William C Vaughn, Jr.
*Assistant Examiner* — Eileen Adams
(74) *Attorney, Agent, or Firm* — Oblon, Spivak, McClelland, Maier & Neustadt, L.L.P.

(57) ABSTRACT

An information processing apparatus includes reproduction control means for controlling reproduction of a first parameter in order to reproduce an edit applied to a first image, generation means for generating a second parameter from a plurality of first parameters reproduced by the reproduction control means, and edit means for editing the first image based on the second parameter generated by the generation means, and generating a second image.

15 Claims, 19 Drawing Sheets

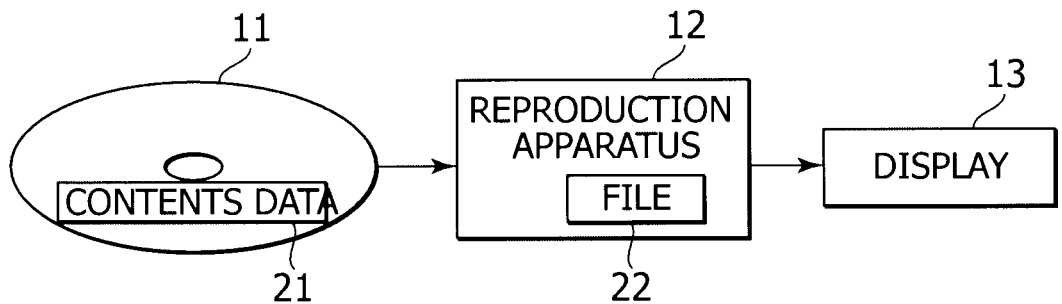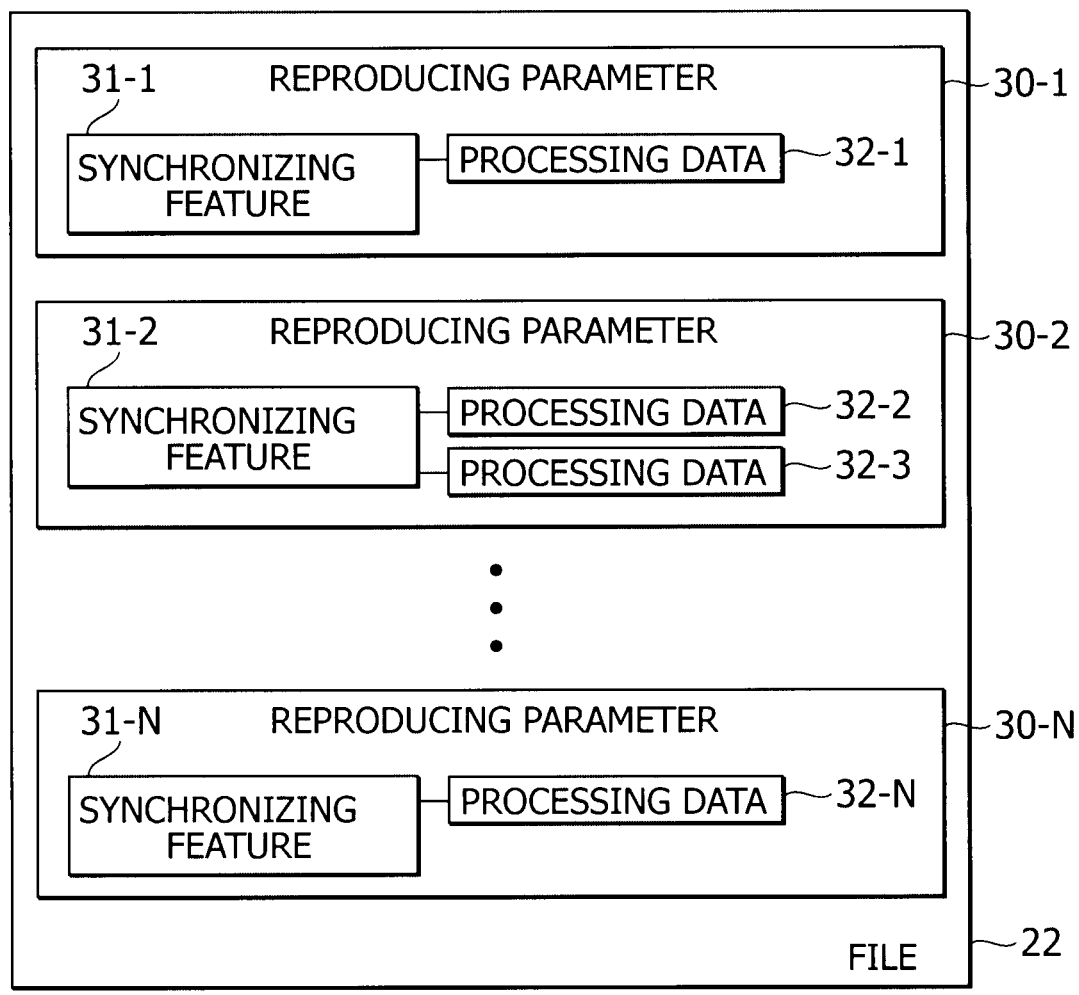

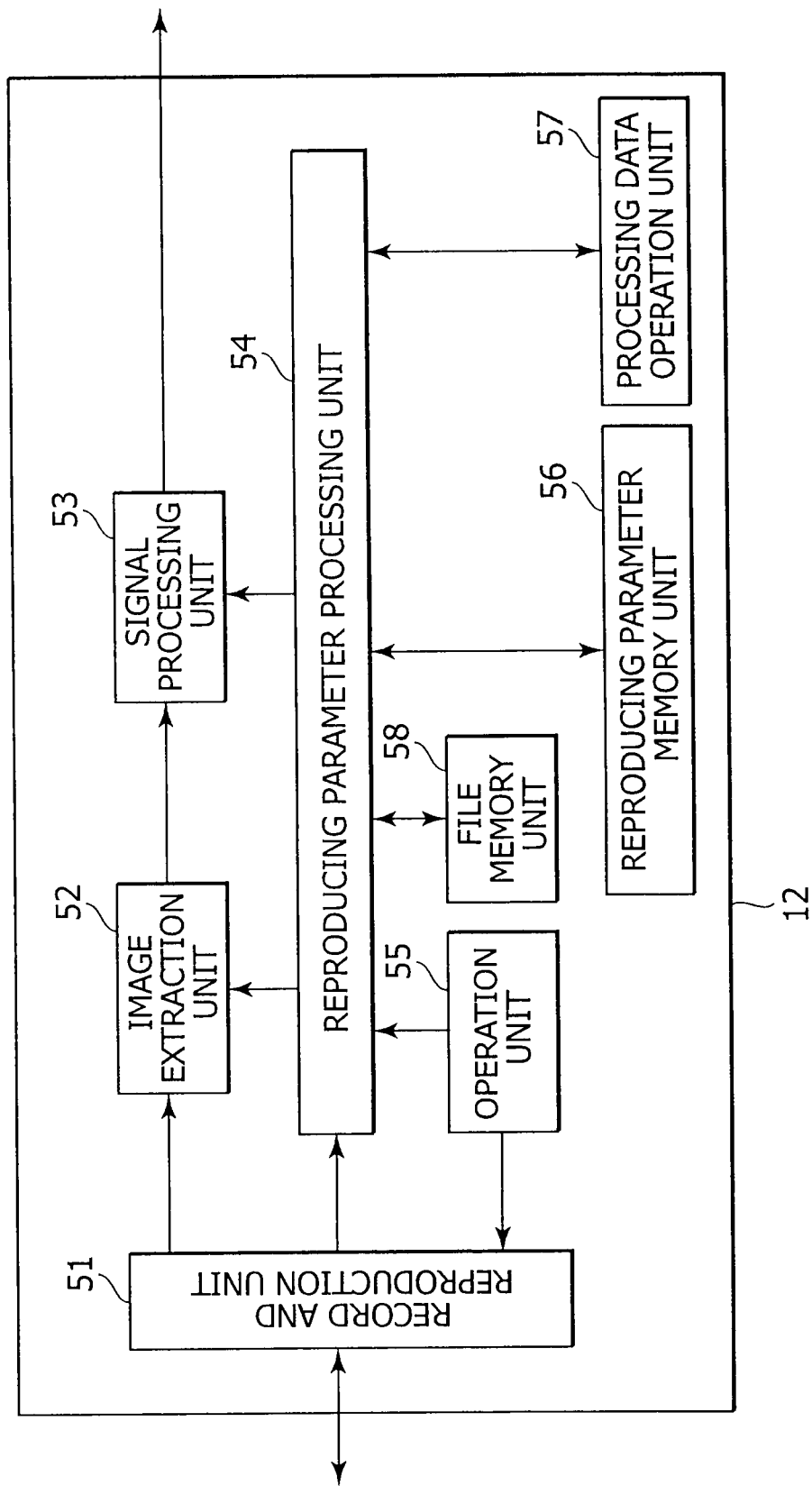

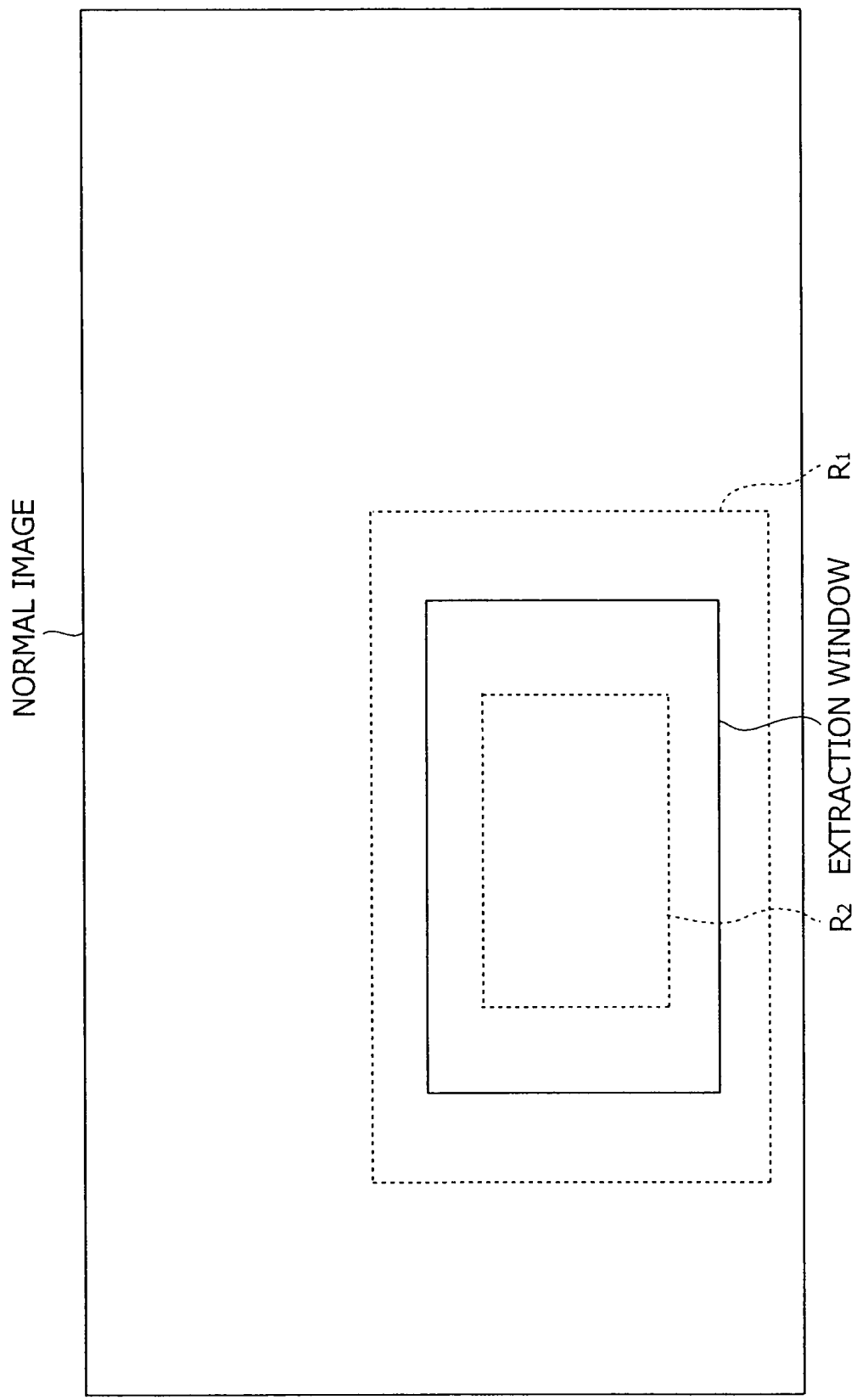

13

71

13

13

INFORMATION PROCESSING APPARATUS, INFORMATION PROCESSING METHOD, PROGRAM, AND RECORDING MEDIUM

BACKGROUND OF THE INVENTION

1. Field of the Invention

The present invention relates to an information processing apparatus, information processing method, a program, and a recording medium, and in particular to an information processing apparatus, information processing method, a program, and a recording medium, which can more simplify editing of an image or the like.

2. Description of the Related Art

For example, in a video camera, an captured image (image data) is coded by, for example, a DV (Digital Video) system or an MPEG (Moving Picture Experts Group) system, and stored on recording media, such as a tape and a disk.

Further, a zoom function is typically provided for the video camera. According to the zoom function, it is possible to change an angle of view (angle of view showing image within range) (magnification) of the captured image. In other words, for example, if an user captures an image by performing zoom-in operation, the image of a narrow angle of view in which an object is closed up (enlarged) can be obtained, and if the user captures an image by performing zoom out operation, the image of a wide angle in which a wide range is shown can be obtained.

A known video camera has been provided with only one image capture means which captures and outputs an image, and therefore, even though the video camera can change an angle of view of the image by way of the zoom operations (zoom-in operation, zoom out operation), it is not possible to obtain images of different angle of view at the same time.

Accordingly, a video camera is proposed which has two image capture means, for example, and can obtain the image of a narrow angle of view and the image of a wide angle of view at the same time (for example, Japanese Patent Application Publication No. JP 2004-282296).

SUMMARY OF THE INVENTION

In order to edit the image captured with the video camera or the like, linear editing has been mainly used in which, while reproducing original image data, operation is carried out to subject the data to various types of processings, and stores the resulting image on another recording medium. Further, when the original image data are of COPY ONCE, in the case of such linear editing, those recorded on the recording medium are reproduced but the image further edited can not be recorded.

Further, when one image is subjected to a plurality of editing respectively, it is difficult to confirm the effect when combination of the plurality of editing is performed. For example, by subjecting the edited image to another editing, the effect is confirmed after the two edits are carried out. If the resulting effect is not a desired one, the original image is subjected to another edit again, and by repeating such a process, the user continues editing until a desired effect is obtained.

The present invention is made in view of the situation, and it is desirable to provide an optimal image to an user.

An aspect of embodiments of the present invention provides an information processing apparatus which includes reproduction control means for controlling reproduction of a first parameter which is for reproducing an edit to be applied for a first image, generation means for generating a second parameter out of a plurality of first parameters reproduced by the reproduction control means, and edit means for editing the first image based on the second parameter generated by the generation means, to generate a second image.

The first parameter may include at least a parameter for extracting a predetermined area from the first image, and the second parameter may be a parameter for extracting an area, including a plurality of areas based on the plurality of first parameters, from the first image.

The first parameter may include at least a parameter for extracting a predetermined area from the first image, and the second parameter may be a parameter for extracting, from the first image, an area for extracting an image in a predetermined area among a plurality of areas based on the plurality of first parameters, and not extracting an image in other areas.

The second parameter may be generated by adding the plurality of first parameters, or by subtracting other parameter from a predetermined parameter among the plurality of first parameters, by way of the generation means.

An aspect of embodiments of the present invention provides an information processing method which includes the a step of controlling reproduction of a first parameter for recreating an edit applied for a first image, a step of generating a second parameter from a plurality of first reproduced parameters, and a step of editing the first image based on the generated second parameter, in order to generate a second image.

An aspect of the present invention provides a computer program for causing a computer to perform processings including a step of controlling reproduction of a first parameter for recreating an edit applied for a first image, a step of generating a second parameter from a plurality of first reproduced parameters, and a step of editing the first image based on the generated second parameter, in order to generate a second image.

An aspect of the present invention provides a recording medium having recorded therein a program for causing a computer to perform a processings including a step of controlling reproduction of a first parameter for recreating an edit applied for a first image, a step of generating a second parameter from a plurality of first reproduced parameters, and a step of editing the first image based on the generated second parameter, in order to generate a second image.

In the information processing apparatus and method, the program, and the program recorded in the recording medium according to an aspect of the present invention, the second parameter is generated from the plurality of first parameters for recreating the edit applied to the first image, and the first image is edited based on the second parameter.

According to one aspect of the present invention, it becomes possible to easily confirm the effects of combining the plurality of edits.

BRIEF DESCRIPTION OF THE DRAWINGS

FIG. 1 is a diagram showing a structure of an embodiment of a system to which the present invention is applied;

FIG. 2 is a diagram for explaining a file;

FIG. 3 is a diagram showing an example of an internal structure of a reproduction apparatus;

FIG. 4 is a drawing for explaining extraction of an image;

DETAILED DESCRIPTION OF THE EMBODIMENTS

Figure 5:
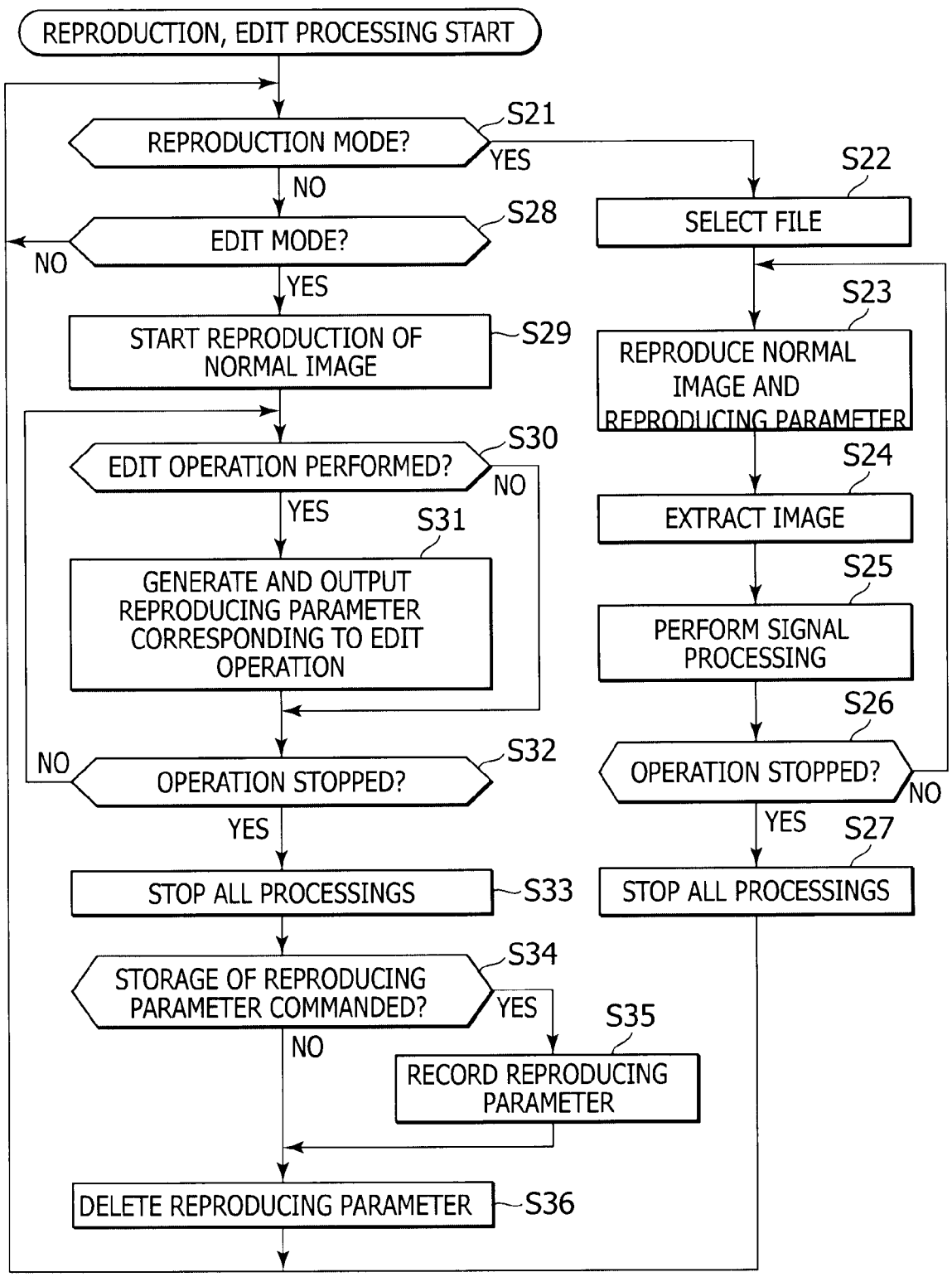
FIG. 5 is a flow chart for explaining operation of the reproduction apparatus.

The embodiments of the present invention will be described below. Correspondence relationships between the constituent elements of the present invention and the embodiments described in the specification or the drawings are as follows. This description is for confirming that the embodiments which support the present invention are described in the specification or the drawings. Therefore, even if there is an embodiment which is described in the specification or the drawings but not described herein as the embodiment corresponding to the constituent elements of the present invention, it does not mean that the embodiment does not correspond to the constituent elements. On the contrary, even if an embodiment is described here as corresponding to the constituent elements, it does not mean that the embodiment does not correspond to any constituent element other than the constituent elements.

An aspect of the present invention provides an information processing apparatus (for example, reproduction apparatus 12 in FIG. 3) which includes reproduction control means (for example, reproducing parameter processing unit 54 in FIG. 3) for controlling reproduction of a first parameter for recreating an edit applied to a first image, generation means for generating a second parameter from a plurality of first parameters reproduced by the reproduction control means (for example, processing data operation unit 57 in FIG. 3), and edit means (for example, image extraction unit 52 in FIG. 3) for editing the first image, based on the second parameter generated by the generation means, in order to generate a second image.

Below, embodiments of the present invention will be described below with reference to drawings.

FIG. 1 is a diagram showing a structure of an embodiment of a system to which the present invention is applied. Image data, such as an image (video image) taken by a user, and a television broadcasting program, is recorded on a recording medium 11. The reproduction apparatus 12 reproduces the image data recorded on the recording medium 11. The reproduced image is supplied to a display apparatus 13 and provided to the user.

In the embodiments of the present invention, the recording medium 11 may be any type of medium. The medium may be, for examples, CD-ROM (Compact Disc-Read Only Memory), DVD (Digital Versatile Disc), and the like, or videotape. Further, in the present embodiment, the description is made by assuming that the recording medium 11 is a recording medium which can be detached from and attached to the reproduction apparatus 12 and the image based on the image data read from the recording medium 11 is reproduced. On the other hand, the present invention also includes an embodiment in which the image data are obtained through a transmission medium constituted by internet, or the like, and the image based on the image data is reproduced.

The reproduction apparatus 12 has a function of reproducing the image data recorded on the recording medium 11. The display apparatus 13 is constituted by CRT (Cathode Ray Tube), LCD (Liquid Crystal Display), and the like, and displays the image from the reproduction apparatus 12.

Now, the data handled in the system as shown in FIG. 1 will be described. Content data 21 are stored in the recording medium 11. A file 22 is stored in the reproduction apparatus 12. An normal image is provided to the user side only when the content data 21 recorded on the recording medium 11 are reproduced by the reproduction apparatus 12. If the content data 21 recorded on the recording medium 11 and the data in the file 22 recorded in the reproduction apparatus 12 are reproduced, an image obtained by subjecting the normal image to a certain edit (processing) is provided to the user side.

As shown in FIG. 2, a plurality of reproducing parameters 30-1 to 30-N are included in the file 22. The reproducing parameters 30-1 to 30-N are data for subjecting the original image obtained by reproducing the content data 21 to the edit carried out by the user, respectively. Thus, in the present embodiment, since the user does not write own edit result into the content data 21, in other words, since the user does not edit the content data 21 itself, the original image may be left as it is.

In the following description, the reproducing parameters 30-1 to 30-N may be simply referred to as the reproducing parameters 30, when the parameters are not required to be distinguished respectively. The same applies to other descriptions.

Further, the user may subject the original image to a plurality of edits separately. In other words, the user may generate a plurality of files 22, the reproducing parameters 30, or processing data 32 with respect to the original image.

For example, if the content data 21 are edited, the original image is lost, and thus the already performed edit is further edited in the case another edit is carried out next. However, in the present embodiment, even if the plurality of edits are carried out, the data for recreating the edits are saved as different data. Thus, it is possible to confirm the results of the respective edits separately, and it is also possible to confirm an effect when the plurality of edit results are combined by way of a process as will be described later.

The reproducing parameter 30 includes a synchronizing feature 31 and the processing data 32, as shown in FIG. 2. The description is made by assuming that the synchronizing feature 31 and the processing data 32 are included in the reproducing parameter 30, but processing can be performed as long as the synchronizing feature 31 and the processing data 32 are associated and stored (if managed in the file 22). Therefore, the synchronizing feature 31 and the processing data 32 are not required to be included in the reproducing parameter 30.

A synchronizing feature 31-1 and a processing data 32-1 are included in the reproducing parameter 30-1. Further, a synchronizing feature 31-2, a processing datum 32-2, and a processing datum 32-3 are included in the reproducing parameter 30-2. The synchronizing feature 31-N and a processing datum 32-M are included in reproducing parameter 30-N.

The synchronizing feature 31 is generated per each field or per each frame. Here, the description is made by assuming that the synchronizing feature is generated per each frame.

The synchronizing feature 31 is information indicating which frame of the content data 21 the reproducing parameter 30 relates to. The synchronizing feature 31 is a feature extracted from a reproduced frame, when the content data 21 are reproduced. As will be described later, when the content data 21 are reproduced, the feature is extracted from the reproduced frame, and whether the synchronizing feature 31 match the extracted feature is determined. When it is determined that the features match, the frame is subjected to the edit as shown by the processing data 32.

The synchronizing feature 31 is a datum for synchronizing with a predetermined frame of the frames which constitute the contents. In other words, the synchronizing feature 31 is a datum used when determining which frame of the frames constituting the contents is for the processing data 32.

The synchronizing feature 31-2, the processing datum 32-2, and the processing datum 32-3 are included in the reproducing parameter 30-2. In this case, two processing data 32-2 and 32-3 are associated with one synchronizing feature 31-2. In this case, even if the image subjected to the edit based on the processing datum 32-2 and the image subjected to the edit based on the processing datum 32-3 are the images from the same frame, they become different images.

As for the reproducing parameter 30-1, one processing datum 32-1 is associated with one synchronizing feature 31-1. In such a case, it is shown that one edit is carried out for one frame. As for the reproducing parameter 30-2, two processing data, the processing datum 32-2 and processing datum 32-3 are associated with one synchronizing feature 31-2. In such a case, it is indicated that two different edits are applied to one frame.

Thus, one processing datum 32 may be associated with one synchronizing feature 31, or alternatively the plurality of processing data 32 may be associated with the feature. A number of the associated processing data 32 is equivalent to a number of the edits applied to one frame.

Thus, the reproducing parameter 30 includes the synchronizing feature 31 for synchronizing with the frame which constitutes the contents, and the processing data 32 for recreating the edit applied to the synchronized frame.

Since the video image based on one contents datum 21 is constituted by a plurality of frames, the plurality of reproducing parameters 30 are generated for one content datum 21. Although it is possible to store the plurality of reproducing parameters 30 as such, it may be easier to manage them by storing them in files as shown in FIG. 2. Then, one file may be generated for one content datum 21, for example, as described above.

As shown in FIG. 2, the reproducing parameter 30-1 and the reproducing parameter 30-2 are included in the file 22, for example. It is assumed that this file 22 is a file including the reproducing parameter 30 corresponding to the content data 21. A file 22' (not shown) which is different from the file 22 is a file for a content datum different from the file 22.

Next, a structure of the reproduction apparatus 12 which reproduces such a reproducing parameter 30 together with the content data 21 is described. FIG. 3 is a diagram showing an example of an internal structure of a reproduction apparatus 12.

The reproduction apparatus 12 includes a record and reproduction unit 51, an image extraction unit 52, a signal processing unit 53, a reproducing parameter processing unit 54, an operation unit 55, a reproducing parameter memory unit 56, a processing data operation unit 57, and a file memory unit 58.

For example, the record and reproduction unit 51 reproduces the content data 21 from the recording medium 11, and supplies an image to the image extraction unit 52 in response to operation by the user by means of the operation unit 55.

In the following description, the image obtained by reproducing the content data 21 is referred to as the normal image. The image obtained by subject the normal image to edit based on the processing data 32 is referred to as an extraction image. Hereinafter, the description is made with reference to an edit in which partly enlarged normal image is displayed. In other words, the description is made with reference to the edit in which a part of the normal image is extracted, enlarged, and displayed.

Returning now to the description with reference to FIG. 3, based on the reproducing parameter 30 supplied from the reproducing parameter processing unit 54, the image extraction unit 52 extracts an image of partial area from the normal image which is supplied from the record and reproduction unit 51, and outputs the extracted abstract image to the signal processing unit 53.

In other words, the reproducing parameter 30 (processing data 32 included therein) includes information showing a rectangular area on the normal image, for example, a side length (width) and a vertical length (height) of the rectangular area, and coordinates at a top left point on the normal image. The image extraction unit 52 specifies, based on the reproducing parameter 30, the rectangular area (hereinafter referred to as extraction window) represented by the information included in the parameter. Then, the image extraction unit 52 extracts the image within the extraction window from the normal image as the extraction image, and supplies the image to the signal processing unit 53.

Based on the reproducing parameter 30 supplied from the reproducing parameter processing unit 54, the signal processing unit 53 subjects the extraction image supplied from the image extraction unit 52 to the signal processing, and supplies the image to the display apparatus 13 (FIG. 1). Thus, the extraction image subjected to the signal processing at the signal processing unit 53 is displayed on the display apparatus 13.

The reproducing parameter processing unit 54 supplies the reproducing parameter 30 supplied from the file memory unit 58, to the image extraction unit 52 and the signal processing unit 53. Further, the reproducing parameter processing unit 54 generates the reproducing parameter 30 in response to the operation by the user by means of the operation unit 55, and supplies the parameter to the image extraction unit 52 and the signal processing unit 53. Furthermore, the reproducing parameter processing unit 54 supplies the reproducing parameter 30 supplied from the file memory unit 58 or the reproducing parameter 30 generated in response to the operation of the operation unit 55, to the reproducing parameter memory unit 56 in order to store therein. Further, the reproducing parameter processing unit 54 reads the reproducing parameter 30 stored in the reproducing parameter memory unit 56, so that the parameter is supplied and stored in the file memory unit 58.

The reproducing parameter memory unit 56 temporarily stores the reproducing parameter supplied from the reproducing parameter processing unit 54. When reproduction command or, edit command, or the like is issued to the content data 21 (normal image) recorded on the recording medium 11, the operation unit 55 is operated by the user and supplies an operation signal corresponding to the operation, to the record and reproduction unit 51 or the reproducing parameter processing unit 54.

The processing data operation unit 57 performs processes, such as addition and subtraction between the processing data 32 as will be described later. The newly generated processing data are supplied to the reproducing parameter processing unit 54. The file memory unit 58 stores the file 22 as shown in FIG. 2.

Although the file memory unit 58 is include in the reproduction apparatus 12 in FIG. 3, the file memory unit 58 may be constituted by a recording medium detachable to the reproduction apparatus 12, and the reproduction apparatus 12 may include a drive where the recording medium is detached/attached. Thus, since the file memory unit 58 includes the recording medium, the recording medium may be attached/detached to other reproduction apparatuses to enable reproduction of the file 22 in the other apparatuses.

Next, with reference to FIG. 4, processing of the image extraction unit 52 in FIG. 3 is described.

For example, when the operation by the user is an operation to enlarge and display a predetermined image within the normal image, in the reproducing parameter 30 includes the processing data 32 having the information indicative of an area corresponding to the extraction image in the normal image. The area indicated by the processing data 32 are set as the extraction window, as shown in FIG. 4, and an image within the extraction window is extracted, from the normal image, as the extraction image, and displayed. By performing such processings, the predetermined image displayed within the normal image is displayed on the display apparatus 13 with enlarged state.

When the user performs an edit corresponding to zoom-in, an angle of view of the normal image obtained by the edit becomes narrow, the area corresponding to the normal image becomes small in size, as shown by $R_1$ or $R_2$ in FIG. 4, and the extraction window also becomes small in size compared to a size of the normal image.

Thus, since the size of the extraction window is not necessarily constant, a number of pixels of the extraction image extracted from the normal image by using such an extraction window is not necessarily constant in the image extraction unit 52.

On the other hand, since the display apparatus 13 displays the image of a predetermined number of pixels, the image extraction unit 52 is required to convert the extraction image extracted from the normal image to an image of the predetermined number of pixels which may be displayed on the display apparatus 13. As an example of an image conversion process of converting the extraction image of a certain number of pixels to the extraction image of other numbers of pixels, there may be a process carried out by interpolating pixels.

Next, with reference to a flow chart of FIG. 5, operation of the reproduction apparatus 12 of FIG. 3 is described. Firstly, basic operation of the reproduction apparatus 12 is described. Here, it is assumed that the basic operation is carried out when one processing datum 32-1 is associated with one synchronizing feature 31-1, as with a case of the reproducing parameter 30-1 of FIG. 2.

When the user operates the operation unit 55 and turns on a power supply of the reproduction apparatus 12, the reproducing parameter processing unit 54 determines, in step S21, whether an operation mode of the reproduction apparatus 12 is a reproduction mode.

Here, as for the operation modes of the reproduction apparatus 12, there are the reproduction mode in which the image stored on the recording medium 11 is reproduced and an edit mode in which the image is edited, for example. The operation mode of the reproduction apparatus 12 can be selected (set up) when the user operates the operation unit 55, for example.

When it is determined that the operation mode of the reproduction apparatus 12 is the reproduction mode at step S21, the process advances to step S22 and the processing of the reproduction mode is started.

In the processing of the reproduction mode, the file 22 used for reproducing the image recorded on the recording medium 11 is selected by the reproducing parameter processing unit 54 at step S22.

Here, as described above, a series of reproducing parameters 30 generated for the normal image (content data 21 in this case) are included in the file 22. Further, the file 22 is stored in the file memory unit 58. One or more files 22 can be stored in the file memory unit 58, and the file 22 used for reproduction of the image is selected from the one or more files 22 at step S22.

In other words, for example, the reproducing parameter processing unit 54 recognizes a file name of the file 22 stored in the file memory unit 58. The file name may be a date and time when the contents data 21 are obtained (recorded on the recording medium 11 by photography, video recording, etc.), or may be a name given by the user, etc. Furthermore, the reproducing parameter processing unit 54 displays on the display apparatus 13 a list of the file names stored in the file memory unit 58 by controlling the signal processing unit 53, together with a message to urge the user to select any one of them.

When the user operates the operation unit 55 and select one file name out of the list of the file names displayed on the display apparatus 13, the reproducing parameter processing unit 54 selects the file 22 specified by the file name as a file 22 used for reproducing the image, in step S22.

Then, the process moves from step S22 to step S23. By controlling the record and reproduction unit 51, the reproducing parameter processing unit 54 starts to reproduce the file 22 stored in the file memory unit 58 and starts to reproduce the contents data 21 recorded on the recording medium 11. Thus, the content data 21 are reproduced (read) from the recording medium 11, and the contents data 21 are supplied to the image extraction unit 52 as well as the file 22 (reproducing parameter 30 included in file 22) is supplied from the file memory unit 58 to the reproducing parameter processing unit 54.

Here, as described above, the reproducing parameter 30 may exist per each frame. The reproduction of the normal image is started with the earliest (in terms of time) frame, where the reproducing parameter 30 exists, unless particularly specified.

In step S23, the reproducing parameter processing unit 54 starts to reproduce the reproducing parameter 30 included in the file 22. Thus, if the reproducing parameter 30 starts to be supplied from the record and reproduction unit 51, the reproducing parameter 30 starts to be supplied to the image extraction unit 52 and the signal processing unit 53, and the process advances to step S24.

In step S24, from the normal image supplied from the record and reproduction unit 51, the image extraction unit 52 starts to extract the extraction image based on the reproducing parameter which is supplied from the reproducing parameter processing unit 54.

In other words, the normal image is supplied from the record and reproduction unit 51 to the image extraction unit 52 per a frame basis, for example. Based on assumption that the frame of the normal image supplied from the record and reproduction unit 51 is a frame of interest, the image extraction unit 52 extracts the extraction image from the frame of interest sequentially, and supplies it to the signal processing unit 53.

In particular, among the reproducing parameters 30 supplied from the reproducing parameter processing unit 54, if the reproducing parameter 30 with respect to the frame of interest (hereinafter referred to as correspondence parameter) exists, the image extraction unit 52 extracts, the image within the extraction window specified by the information included in the correspondence parameter, from the frame of interest as the extraction image and performs the image conversion process of changing the number of pixels to be supplied to the signal processing unit 53, where necessary.

Further, if the correspondence parameter of the frame of interest does not exist in the reproducing parameters 30 supplied from the reproducing parameter processing unit 54, the image extraction unit 52 may extract the extraction image from the frame of interest based on the correspondence parameter 22 of the frame nearest to the frame of interest of the frames in which the correspondence parameters before the frame of interest exists. Alternatively, since the absence of the corresponding parameter means that the edit is not performed, the normal image may be outputted.

After the processing in step S24, the process moves to step S25, and the signal processing unit 53 starts performing the signal processing on the extraction image (its frame) supplied from the image extraction unit 52, based on the reproducing parameter (correspondence parameter) supplied from the reproducing parameter processing unit 54.

In other words, the signal processing unit 53 subjects the extraction image supplied from the image extraction unit 52, to the signal process indicated by the information which is included in the reproducing parameter 30 supplied from the reproducing parameter processing unit 54, and supplies it to the display apparatus 13.

As described above, in the process of the reproduction mode, since the extraction image is extracted from the normal image based on the reproducing parameter 30 included in the file 22 and further the extraction image is subjected to the signal process based on the reproducing parameter 30, the image content (stream of image) corresponding to the reproducing parameter 30 of the file 22 is displayed on the display apparatus 13.

After the processing in step S25, the process advances to step S26. The reproducing parameter processing unit 54 determines whether the operation unit 55 is operated (stop operation) by the user to stop the reproduction. In step S26, if it is determined that the stop operation is not performed, the process returns to step S23 and the similar processing is repeated.

When it is determined that the stop operation is performed in step S25, the process advances to step S27. The reproducing parameter processing unit 54 controls the record and reproduction unit 51, the image extraction unit 52, and the signal processing unit 53, to stop all of the processes of reproducing the normal image and the reproducing parameter started at step S23, extracting the extraction image started at step S24, signal processing subjected to the extraction image at step S25. Then, the process returns to step S21 and the similar processing is repeated.

On the other hand, in step S21, when it is determined that the operation mode of the reproduction apparatus 12 is not the reproduction mode, the process advances to step S28 and the reproducing parameter processing unit 54 determines whether the operation mode of the reproduction apparatus 12 is the edit mode. In step S28, if it is determined that the operation mode of the reproduction apparatus 12 is not the edit mode, the process returns to step S21 and the similar processing is repeated.

Further, in step S28, if it is determined that the operation mode of the reproduction apparatus 12 is the edit mode, the process advances to step S29 and the processing in the edit mode is performed.

In the processing of the edit mode, the record and reproduction unit 51 starts to reproduce the content data 21 recorded on the recording medium 11 at step S29, whereby, the content data 21 are reproduced (read) from the recording medium 11, and the normal image is supplied to the image extraction unit 52.

Alternatively, in step S29, the reproducing parameter 30 (file 22) (set for reproduction) used for reproducing the contents data 21 which may be a reference of edit, is selected by the reproducing parameter processing unit 54 as with the case of step S22, for example. Then, the reproducing parameter processing unit 54 starts to reproduce the content data 21 and the set for reproduction by controlling the record and reproduction unit 51 as with the case of step S23, whereby the contents data 21 are reproduced (read) from the recording medium 11, the normal image is supplied to the image extraction unit 52, and the reproducing parameter of the set for reproduction is supplied from the file memory unit 58 to the reproducing parameter processing unit 54.

The reproducing parameter 30 starts to reproduce the set for reproduction. Thus, as the supply of the reproducing parameter 30 from the record and reproduction unit 51 is started, the reproducing parameter processing unit 54 starts the supply of the reproducing parameter 30 to the image extraction unit 52, the signal processing unit 53, and the reproducing parameter memory unit 56, and the process advances to step S30.

The reproduction apparatus 12 reproduces only the contents data 21 and can provide the normal image. Therefore, the user may reproduce the contents data 21 recorded on the recording medium 11, and edit the normal image which is provided in accordance with the reproduction.

Further, by reproducing the reproducing parameter 30 included in the content data 21 and the file 22, the reproduction apparatus 12 can provide the edited normal image to an user. Therefore, the user reproduces the contents data 21 and the reproducing parameter 30, and can further edit the edited normal image provided in accordance with the reproduction.

As with the processing in step S22, whether the normal image is edited or the edited image is further edited may be determined by causing the user to select a file name. When the file name is adapted to be selected, a file name for editing the normal image is also displayed.

Here, the description is made with reference to the case where the normal image is edited.

In step S30, the reproducing parameter processing unit 54 determines whether the user operates the operation unit 55 to issue the edit command. In step S30, if where it is determined that the edit command is not issued, in other words, if it is determined that the user does not operate the operation unit 55 such that to the edit command is issued, step S31 is skipped and the process advances to step S32.

Further, in step S30, if it is determined that the edit operation is performed, in other words, if it is determined that the user operates the operation unit 55 to issue the edit command, the process advances to step S31. As the correspondence parameter of the frame of interest of the normal image which is the frame of interest when the edit operation is performed, the reproducing parameter processing unit 54 generates a reproducing parameter (new reproducing parameter) (hereafter may be referred to as editing parameter) in accordance with the edit operation, and supplies it to the image extraction unit 52, the signal processing unit 53, and the reproducing parameter memory unit 56.

In this case, therefore, in the image extraction unit 52, the image within the extraction window which is specified by the information included in the editing parameter from the reproducing parameter processing unit 54 is extracted from the normal image as the extraction image. In the signal processing unit 53, the extraction image supplied from the image extraction unit 52 is subjected to the signal process which is indicated by the information included in the editing parameter supplied from the reproducing parameter processing unit 54, to be supplied to the display apparatus 13. As a result, the image edited according to the edit operation is displayed on the display apparatus 13.

Furthermore, the reproducing parameter memory unit 56 stores the editing parameter supplied from the reproducing parameter processing unit 54. At this time, the feature is extracted from the frame of interest, and with relevance to the feature, the editing parameter is generated and stored. In the processing as will be described later, when the editing parameter is stored in the file memory unit 58, the feature is stored as the synchronizing feature 31, and the parameter generated with respect to the edit is stored as the processing data 32 with relevance to the synchronizing feature 31.

When the reproducing parameter 30 with respect to the normal image (contents data 21) to be edited already exists, the synchronizing feature 31 included in the reproducing parameter 30 is read and stored in the reproducing parameter memory unit 56. Then, in the process of associating to the synchronizing feature 31, the parameter regarding the new edit is associated, and the editing parameter is generated and stored.

In step S31, the editing parameter is supplied to the image extraction unit 52, the signal processing unit 53, and the reproducing parameter memory unit 56, and thereafter the process advances to step S32. The reproducing parameter processing unit 54 determines whether the operation unit 55 is operated by the user so that the reproduction may be stopped (stop operation). If it is determined in the step S32 that stop operation is not performed, the process returns to step S30 and the similar processing is repeated.

Further, in step S32, when it is determined that stop operation is performed, the process advances to step S33. By controlling the record and reproduction unit 51, the image extraction unit 52, and the signal processing unit 53, the reproducing parameter processing unit 54 stops all of the processes of reproducing the normal image, extracting the image, and subjecting the extraction image to the signal processing.

In step S34, the reproducing parameter processing unit 54 determines whether a parameter set which is a set of the reproducing parameters stored in the reproducing parameter memory unit 56 is newly stored (saved) in the file memory unit 58.

In other words, by controlling the signal processing unit 53, the reproducing parameter processing unit 54 causes the display apparatus 13 to display an inquiry message for asking whether the new parameter set is saved. After the user operates the operation unit 55 with respect to the inquiry message, whether the new parameter set stored in the reproducing parameter memory unit 56 is stored in the file memory unit 58 is determined.

In step S34, if it is determined that the new parameter set stored in the reproducing parameter memory unit 56 is stored in the file memory unit 58, in other words, if the user operates the operation unit 55 with respect to the inquiry message so that the new parameter set may be stored, the process advances to step S35. The reproducing parameter processing unit 54 reads the new parameter set stored in the reproducing parameter memory unit 56, and stores the new parameter set in the file memory unit 58.

Further, in step S34, if it is determined that the new parameter set stored in the reproducing parameter memory unit 56 is not stored in the file memory unit 58, in other words, if the user operates the operation unit 55 with respect to the inquiry message so that the new parameter set may not be stored, step S35 is skipped and the process advances to step S36. The reproducing parameter processing unit 54 deletes (eliminates) the new parameter set stored in the reproducing parameter memory unit 56, the process returns to step S21, and the similar processing is repeated.

The new parameter set stored in the file memory unit 58 in the processing of the edit mode may be selected as the set for reproduction, and therefore the image content corresponding to the reproducing parameter of the new parameter set can be displayed on the display apparatus 13.

Further, the processing according to the flow chart of FIG. 5 is ended, when the operation unit 55 is operated by the user so that the power supply thereof may be turned off.

As described above, as the user performs the edit operation, the editing parameter (new reproducing parameter) is generated in response to the edit operation, and the extraction processing and the signal processing are performed based on the editing parameter. Accordingly, the user can easily carry out a desired edit, and the optimal image may be provided to the user.

Furthermore, with respect to the contents data 21 (normal image) recorded on the recording medium 11, a plurality of parameter sets (processing data 32) may exist. Accordingly, the user may perform various edit operations to generate various parameter sets, so that various image contents corresponding to the respective parameter sets can be made.

Here, the description is further made when the edit specified by the user in the edit mode is tracking zoom. As described above, the user can perform an edit of enlarging a part of the normal image as the edit. Firstly, the enlargement will be described with reference to FIGS. 6A to 6C.

Figure 6A:
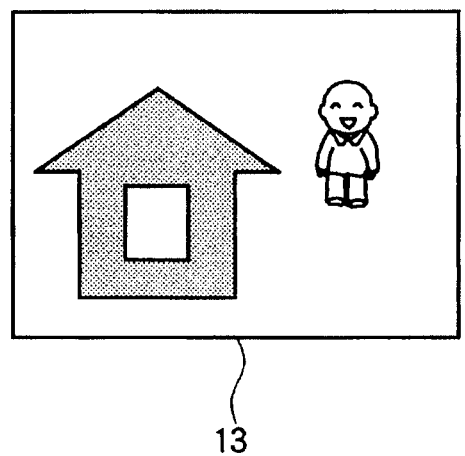
FIG. 6 is a schematic drawing for explaining zooming.

FIG. 6A shows an example of the image displayed on the display apparatus 13. The image shown in FIG. 6A is an image in which a house and people are displayed. When such an image is displayed, the user wishes to see faces in details and enlarges the images of faces. When enlargement of the predetermined image is commanded, a range of the image to be enlarged is set by the user.

Figure 6B:
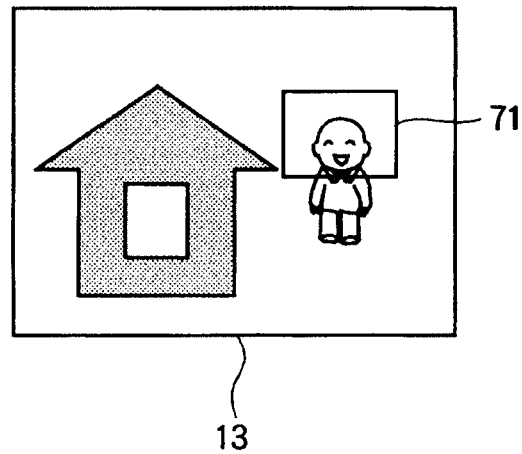
Figure 6C:
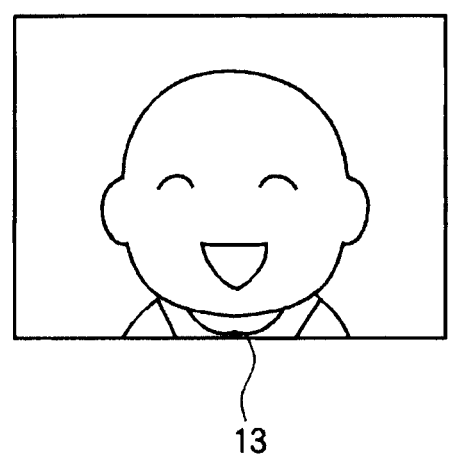

FIG. 6B shows a situation where an image frame 71 to be enlarged is set to the face portions in images by the user. In the case of the example as shown in FIG. 6B, the image frame 71 is set to the face portions in images. When the image frame 71 is thus set, only the image within the range where the image frame 71 is set is displayed on the display apparatus 13. In other words, in this case, even when the normal image as shown in FIG. 6B is displayed on the display apparatus 13, the images of faces are displayed on the display apparatus 13 as shown in FIG. 6C, because the enlargement is commanded.

Tracking zoom function is provided so that the user may be free from performing operation with respect to such enlargement per each frame, and generation of the reproducing parameter 30 per each frame may be prevented. The tracking zoom is described with reference to FIGS. 7A to 7E.

The tracking zoom is an assist function when the user uses a zoom function. This assist function is a function in which the user operates the operation unit 55 to focus and specify a tracking point on a target to be zoomed, and while carrying out a process of tracking the target (while carrying out a process of tracking), zoom processing is continued. Some applications for processing the tracking zoom are arranged such that a zoom image frame can be changed during the tracking zoom or the tracking point can be changed.

Figure 7A:
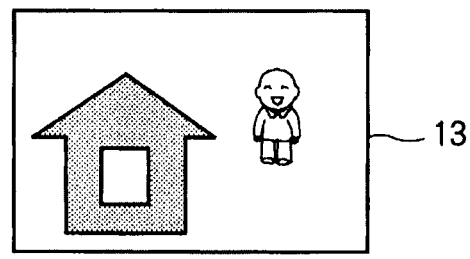
FIG. 7 is a drawing for explaining tracking zoom.

FIG. 7A shows an example of the image displayed on the display apparatus 13. The image shown in FIG. 7A is an image in which the house and people are displayed. When such an image is displayed, the user wishes to look at faces more in detail, and thus it is set such that images of people's faces are zoomed up and people's faces are constantly displayed in enlarged state. In other words, in this case, the tracking zoom is set to people's faces.

Figure 7B:
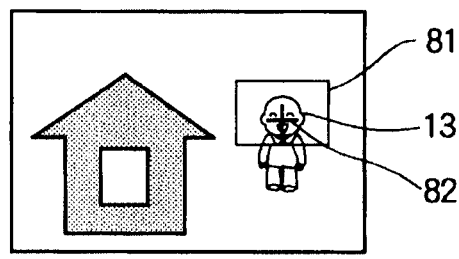

In the case the image is commanded to be displayed by being tracked while the predetermined image is enlarged, a center and a range of the image to be enlarged are set by the user. FIG. 7B shows a situation where an image frame 81 for zooming is set to the people's face portion in the image by the user. This image frame 81 may be set to be a predetermined size with a center thereof is a tracking point 82, or the size may be set by the user.

Figure 7C:
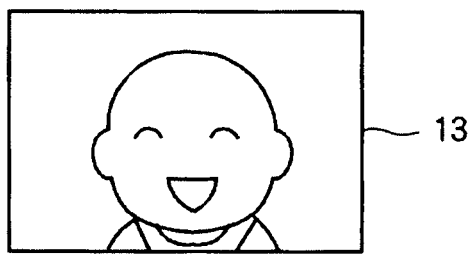

In the case of the example shown in FIG. 7B, the tracking point 82 is set to the image portion of the people's faces, and the image frame 81 is set so as to include whole portions of people's faces. When the tracking point 82 and the image frame 81 are thus set, the display apparatus 13 displays only the image within the range to which the image frame 81 is set. At this time, the tracking point becomes the center of screen and zoomed up in accordance with the zoom image frame (zoom rate). In other words, as shown in FIG. 7C, in this case, the image of the people's faces are displayed on the display apparatus 13.

Figure 7D:
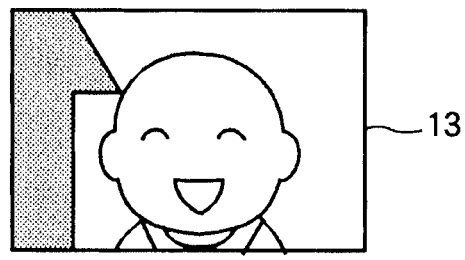

Furthermore, when people in this screen moves, they are tracked while the enlarged state is maintained, accordingly an image, as shown in FIG. 7D, is displayed on the display apparatus 13, for example. Comparing FIG. 7C with FIG. 7D, a part of the house which is not displayed in FIG. 7C is shown in FIG. 7D. The image shown in FIG. 7D is an image when the image shown in FIG. 7E which is displayed on the display apparatus 13, when the tracking zoom is not set.

Figure 7E:
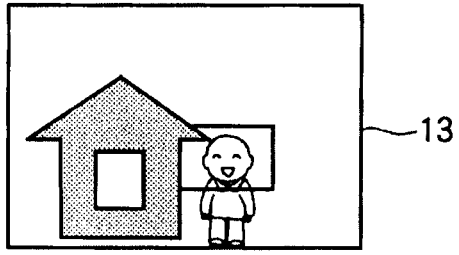

FIG. 7E is illustrated for explanation and is not the image to be provided for the user as long as the user does not specify in the practical processings. In the image, the tracking point and the zoom image frame are displayed in an input image during the tracking zoom. In the image in FIG. 7E, the man is moving towards the bottom left in the figure with respect to the image of FIG. 7B. When the target to be tracked moves, the tracking zoom processing is performed while following (tracking) the target, whereby the user is provided with the image as shown in FIG. 7D.

Therefore, while the tracking zoom processing is performed, an image can be obtained as if the camera is moved and tracks the target when the image is taken.

In this manner, when an edit referred to as tracking zoom is specified in step S30, the editing parameter (reproducing parameter 30) is generated which includes either one or both of the information on a position within the normal image of the image tracked in the tracking zoom process (for example, information on coordinates where the tracking point 82 is located) and the information on the size (for example, information on the image frame 81) in step S31.

The reproducing parameter 30 continues to be generated by repeating the processing of step S30 and step S31 until the tracking zoom is stopped. In other words, the user may only set the tracking zoom once and the reproducing parameter 30 continues to be generated.

The thus generated reproducing parameter 30 and the contents data 21 of the normal image are reproduced, so that the user can view the edited normal image which is tracked and zoomed. In other words, the image specified by the user is extracted from the normal image, and the user is provided with the enlarged image.

Further, the description is continued with reference to the case where the tracking zoom is specified as the edit. For example, the description is continued with reference to the case where the content data 21 are reproduced so that the normal image is displayed on the display apparatus 13 as shown in FIG. 8.

Figure 8:
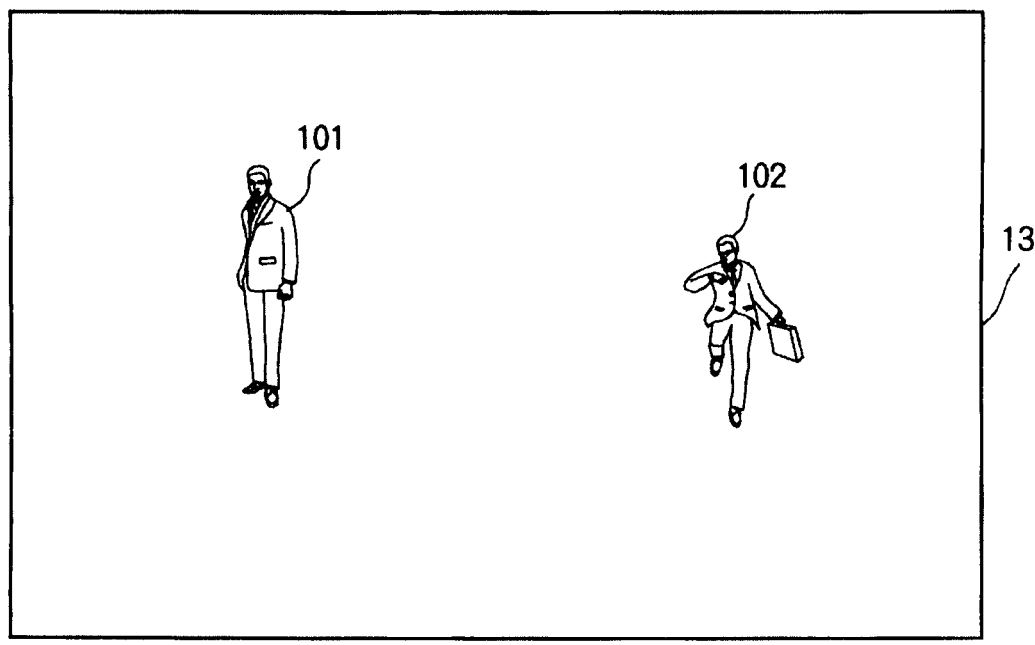
FIG. 8 is an example of the image displayed on a display apparatus.
Figure 9:
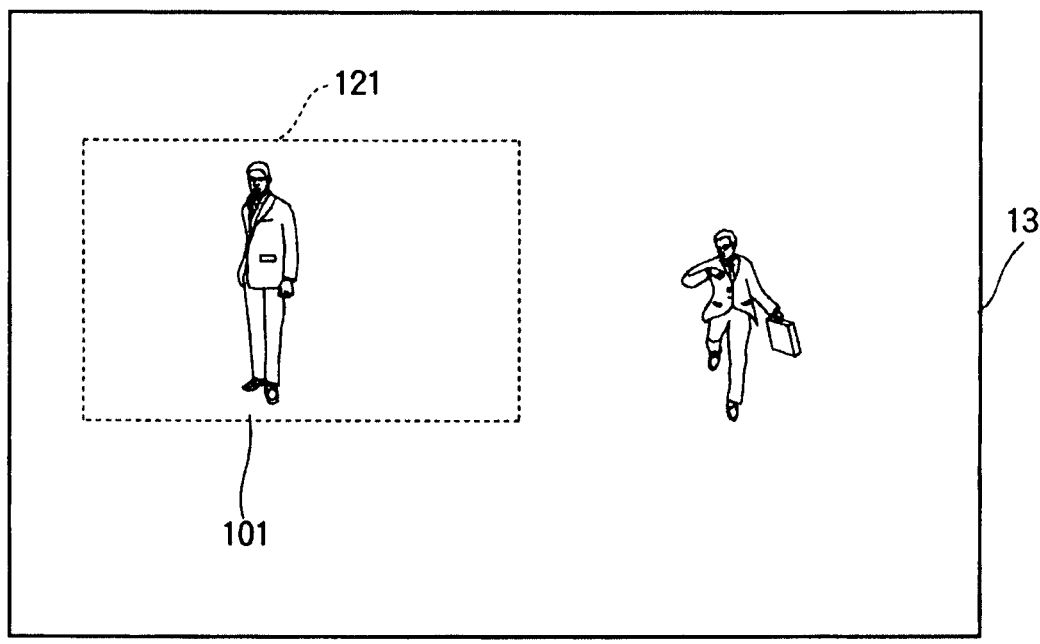
FIG. 9 is an example of the image displayed on the display apparatus.
Figure 10:
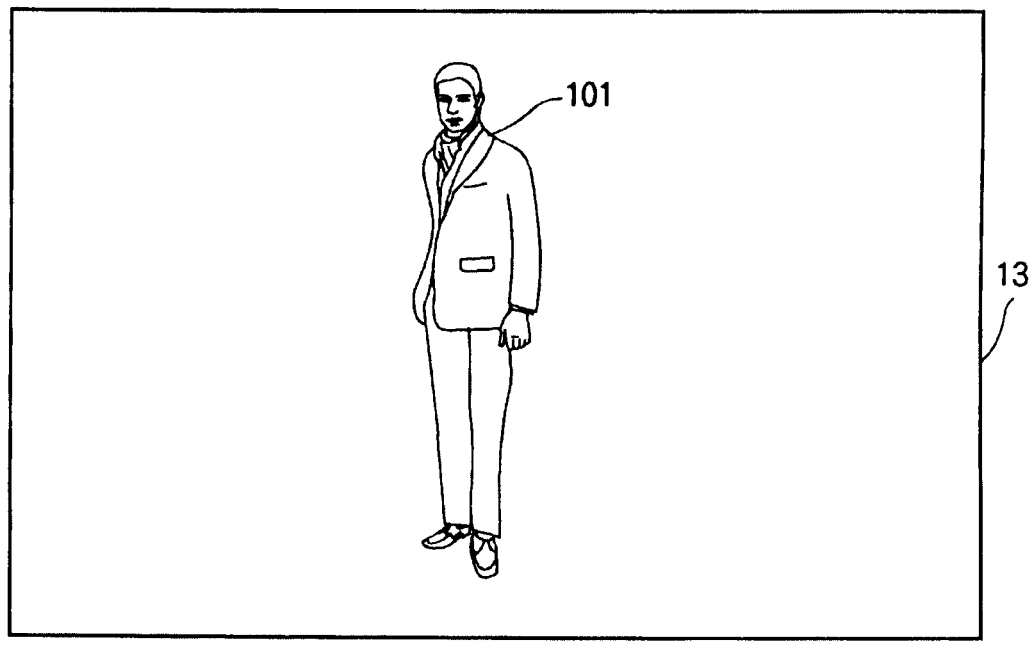
FIG. 10 is an example of the image displayed on the display apparatus.

A person 101 and a person 102 are displayed on the normal image shown in FIG. 8. If the user wishes to perform the tracking zoom against the person 101, an image frame 121 is set to surround the person 101 as shown in FIG. 9 (hereinafter description is made by omitting setting of tracking point). An aspect ratio of this image frame 121 is the same as an aspect ratio of the image frame of the display apparatus 13. When the tracking zoom process is performed by this image frame 121, the user is provided with the image in which only the person 101 is enlarged and displayed, as shown in FIG. 10.

Figure 11:
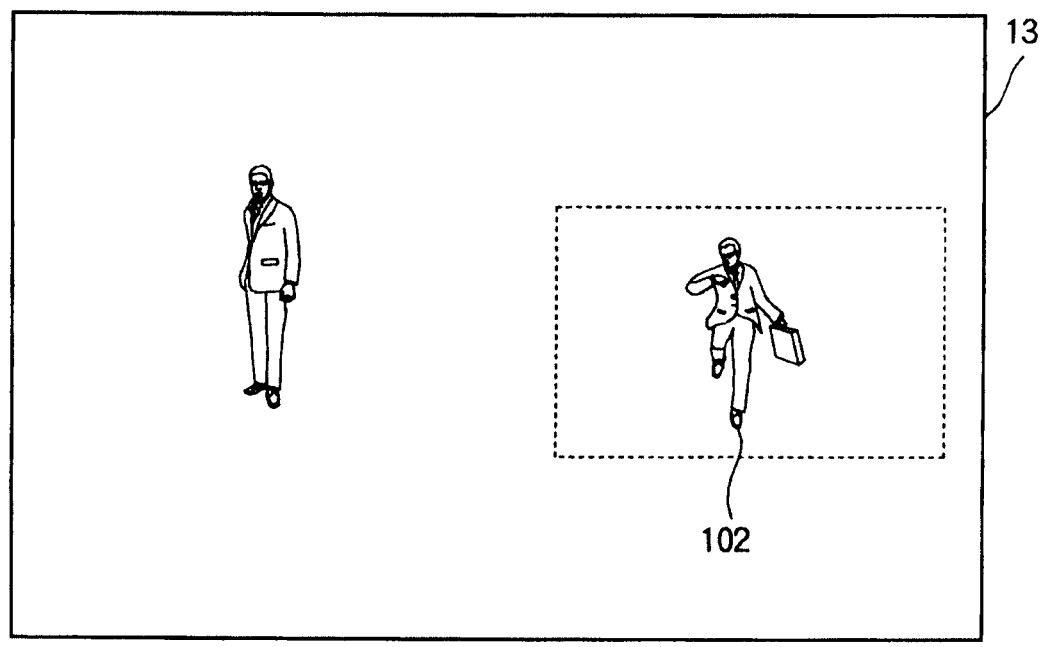
FIG. 11 is an example of the image displayed on the display apparatus.
Figure 12:
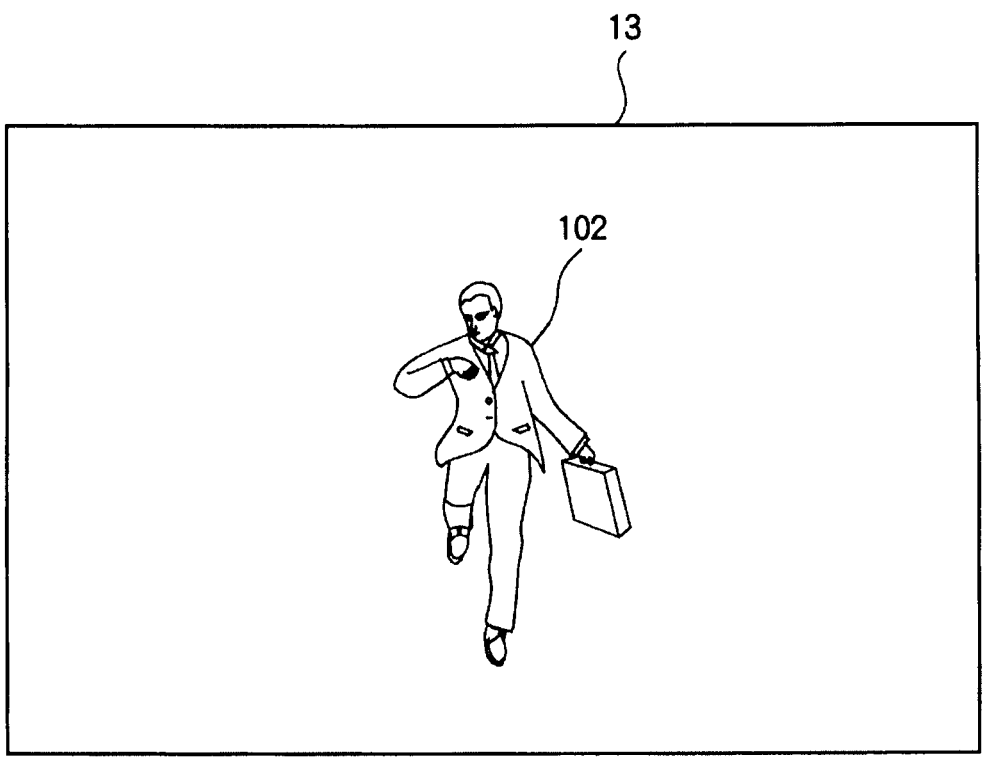
FIG. 12 is an example of the image displayed on the display apparatus.

In the case the user wishes to perform the tracking zoom to the person 102, an image frame 122 is set to surround the person 102 as shown in FIG. 11. As a result, by performing the tracking zoom process, the user is provided with the image in which only the person 102 is enlarged and displayed, as shown in FIG. 12.

In this way, for example, with respect to the normal image in which the person 101 and the person 102 are displayed, it is possible to perform the tracking zoom process separately for the person 101 and the person 102. In such a case, the edit is performed separately, and separate processing data 32 are generated and stored.

Figure 13:
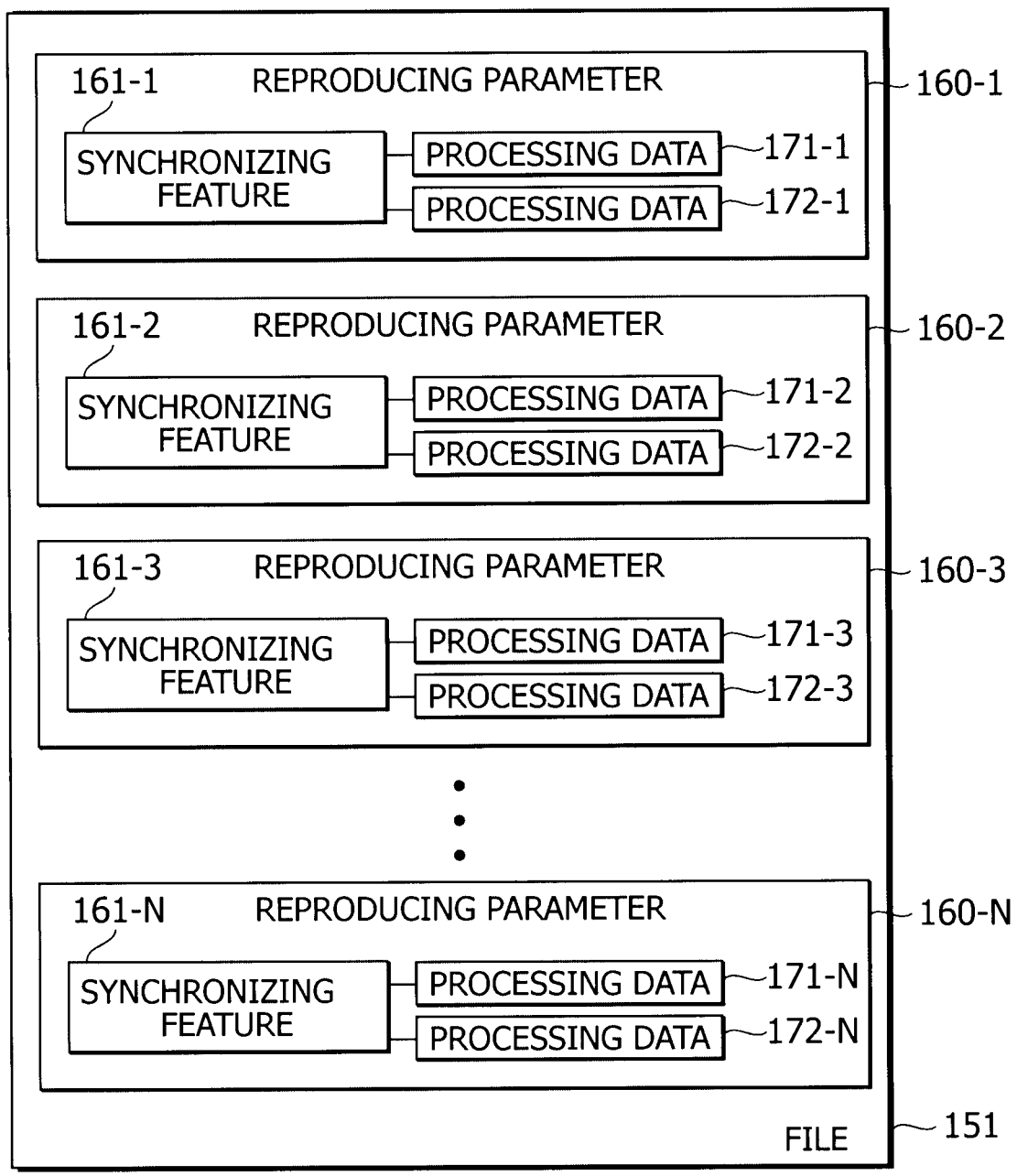
FIG. 13 is a diagram for explaining the file.

With reference to FIG. 13, the parameter generated in this way when two edits are performed to one normal image is described. A file 151 includes reproducing parameters 160-1 to 160-N. A processing datum 171-1 and a processing datum 172-1 are associated with a synchronizing feature 161-1 and the data are included in the reproducing parameter 160-1. Similarly, a processing datum 171-2 and a processing datum 172-2 are associated with a synchronizing feature 161-2, and the data are included in the reproducing parameter 160-2. Similarly, a processing datum 171-3 and a processing datum 172-3 are associated with a synchronizing feature 161-3, and the data are included in the reproducing parameter 160-3. Similarly, a processing datum 171-N and a processing datum 172-N are associated with a synchronizing feature 161-N, and the data are included in the reproducing parameter 160-N.

Among the processing datum 171-1 and the processing datum 172-1 associated with the reproducing parameter 160-

1, the processing datum 171-1 is a datum generated when the edit of tracking zoom is performed on the person 101, and the processing datum 172-1 is a datum generated when the edit of tracking zoom is performed on the person 102. Thus, when two edits are performed on one frame, two processing data 171 and 172 are associated with one synchronizing feature 161.

For example, when the image (frame) as shown in FIG. 8 is edited based on the processing datum 171-1, the image in which the person 101 shown in FIG. 10 is enlarged is displayed on the display apparatus 13. When the edit based on the processing datum 172-1 is performed, the image in which the person 102 is enlarged as shown in FIG. 12 is displayed on the display apparatus 13.

The image based on the contents data 21 is constituted of a plurality of frames. For example, if an image is constituted by N frames, N reproducing parameters 160-1 to 160-N are included in the file 151 corresponding to the contents data 21 as shown in FIG. 13.

Thus, when there are two processing datum 171 and processing datum 172, it is also possible to reproduce them respectively or separately as described above. When the data are reproduced separately, process is similar to the one relating to reproduction where one processing datum is associated with one synchronizing feature. The process with respect to the reproduction when one processing datum is associated with one synchronizing feature is carried out as described above, and thus the description thereof is omitted.

Next, the process when two processing data are related with one synchronizing feature, in other words, when the file 151 as shown in FIG. 13 is reproduced together with the contents data 21 is described. Firstly, here, the image displayed on the display apparatus 13 when two processing data are simultaneously processed is described with reference to FIGS. 14 to 19.

Figure 14:
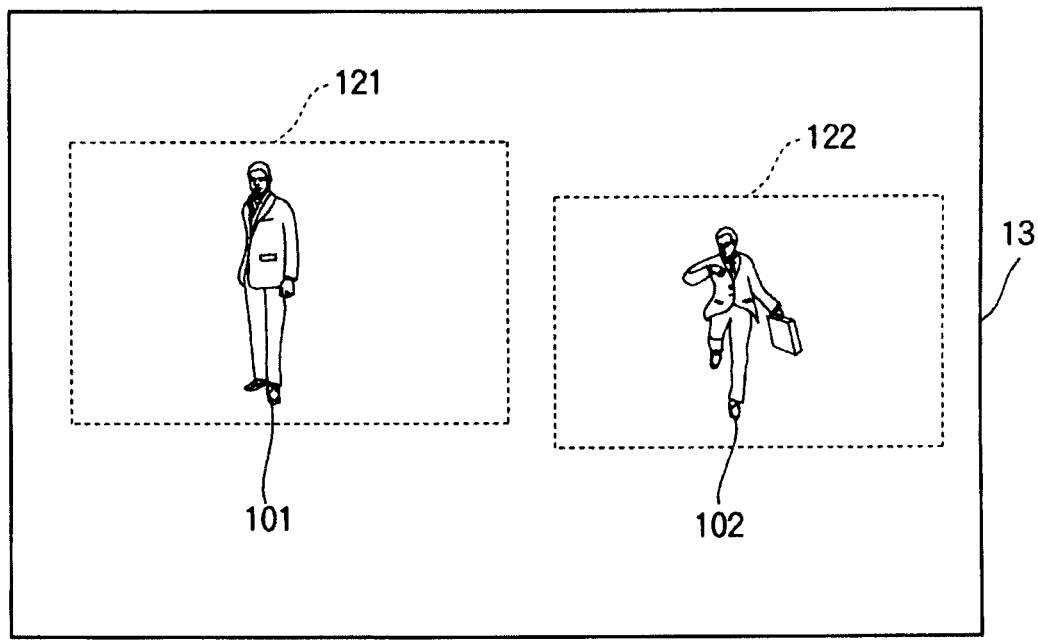
FIG. 14 is an example of the image displayed on the display apparatus.

FIG. 14 shows a state when the user side is provided with the image as shown in FIG. 8, and is a view apparently illustrating a situation where the image frame 121 is set to the person 101 as shown in FIG. 9, and a situation where the image frame 122 is set to the person 102 as shown in FIG. 11, on the same image.

As described above, the processing data 171 of FIG. 13 are data generated when the tracking zoom is carried out by means of the image frame 121 set to the person 101, and the processing data 172 of FIG. 13 are data generated when the tracking zoom is carried out by means of the image frame 122 set to the person 102. In other words, when the processing data 171 and the processing data 172 are simultaneously reproduced, the user is provided with the image in which the tracking zoom by means of the image frame 121 set to the person 101 and the tracking zoom by means of the image frame 122 set to the person 102 are simultaneously performed as shown in FIG. 14.

Here, when the user is provided with the image in which two tracking zooms are simultaneously performed, in other words, when two image frames are set and the tracking zooms are performed by the two image frames, the description is made by assuming that the tracking zoom is performed by a new image frame generated by adding two image frames.

Figure 15:
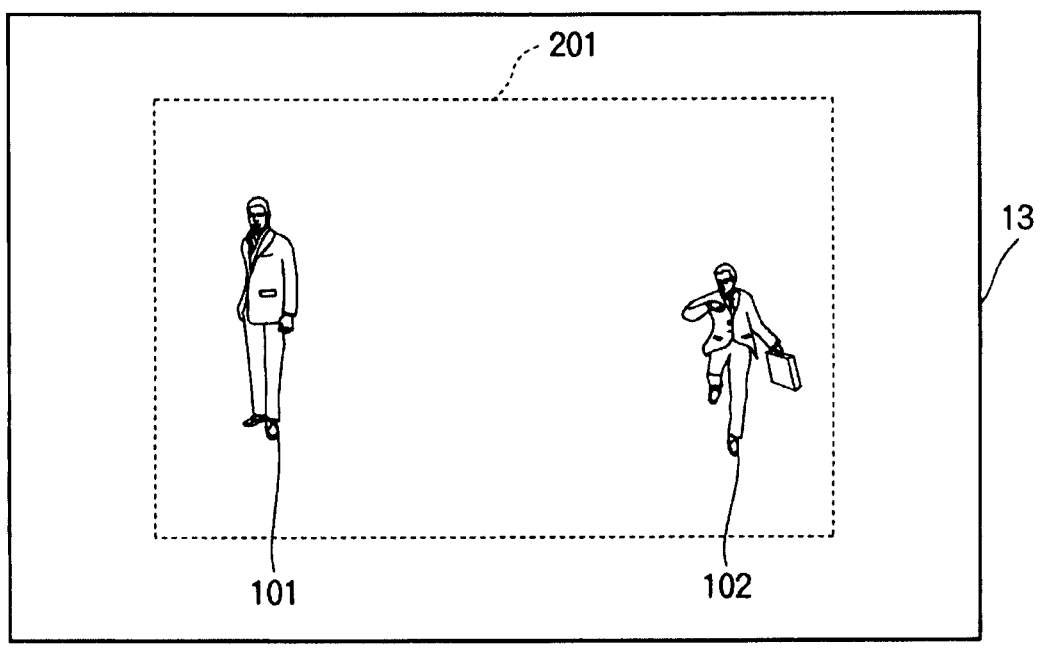
FIG. 15 is an example of the image displayed on the display apparatus.
Figure 16:
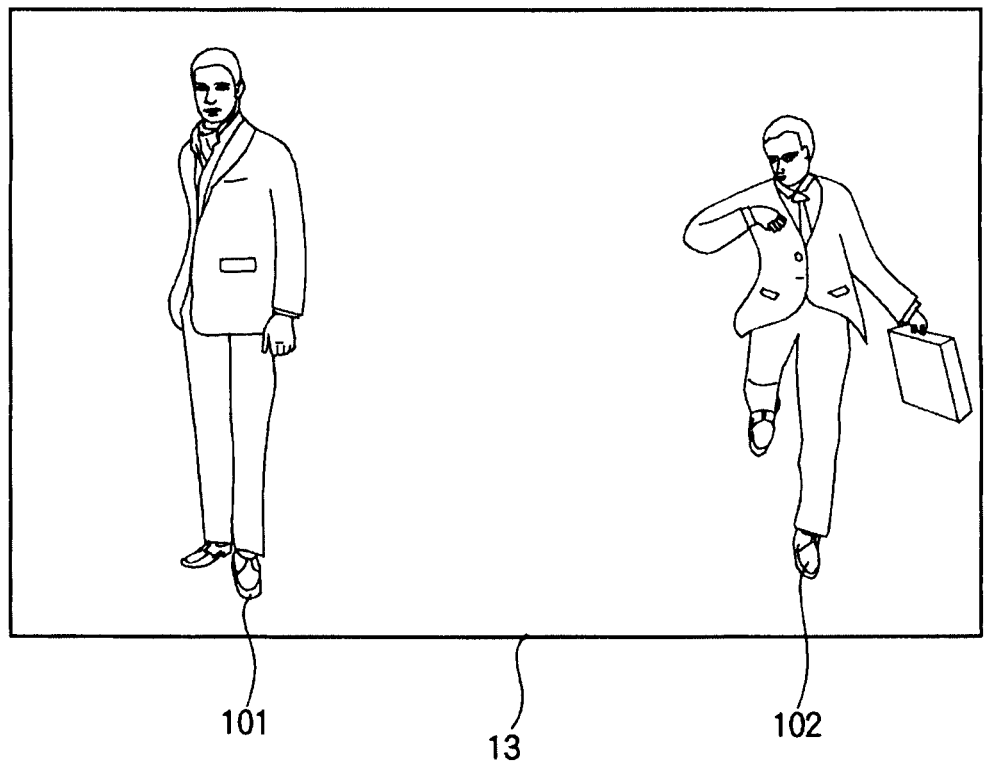
FIG. 16 is an example of the image displayed on the display apparatus.

In this case, as shown in FIG. 15, an image frame 201 including the image frame 121 and the image frame 122 is newly set, and the user is provided with the result from the tracking zoom in this image frame 201. The image frame 201 is a size of an image frame in which the person 101 and the person 102 are included. When the tracking zoom process is performed by the image frame 201 as described above, the user is provided with an image as shown in FIG. 16. As shown in FIG. 16, the user is provided with an image which is enlarged one within the image frame 201 as shown in FIG. 15.

Figure 17:
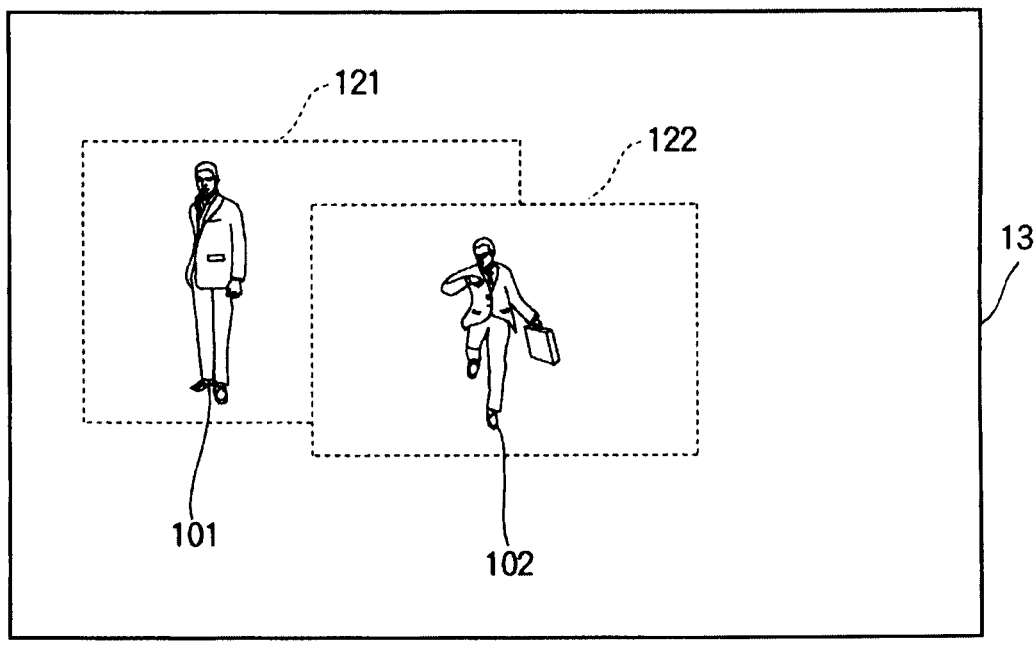
FIG. 17 is an example of the image displayed on the display apparatus.
Figure 18:
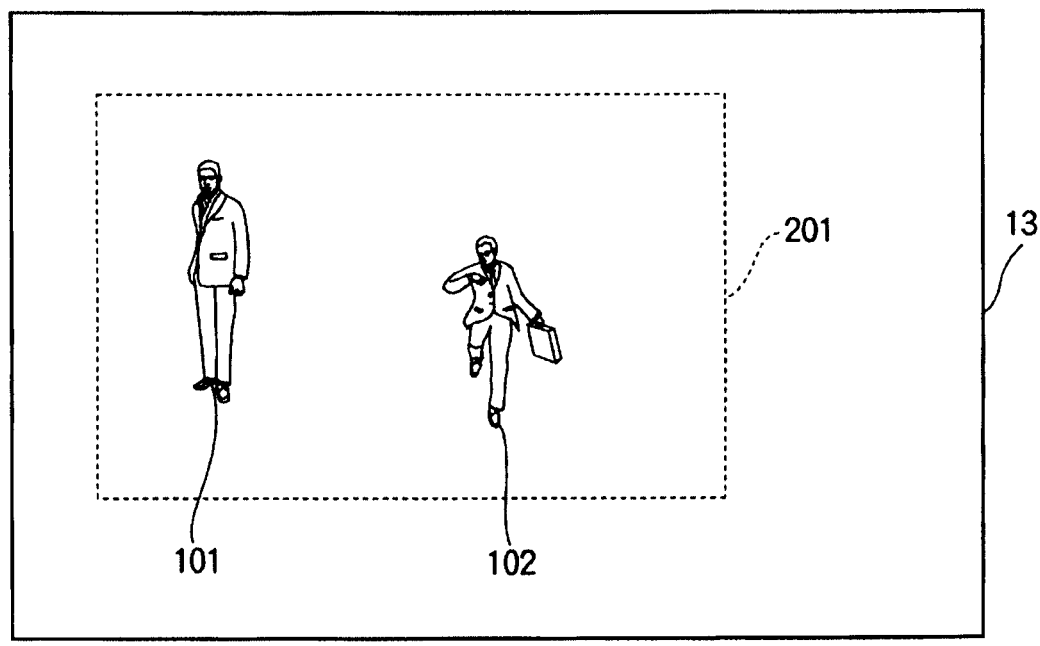
FIG. 18 is an example of the image displayed on the display apparatus.
Figure 19:
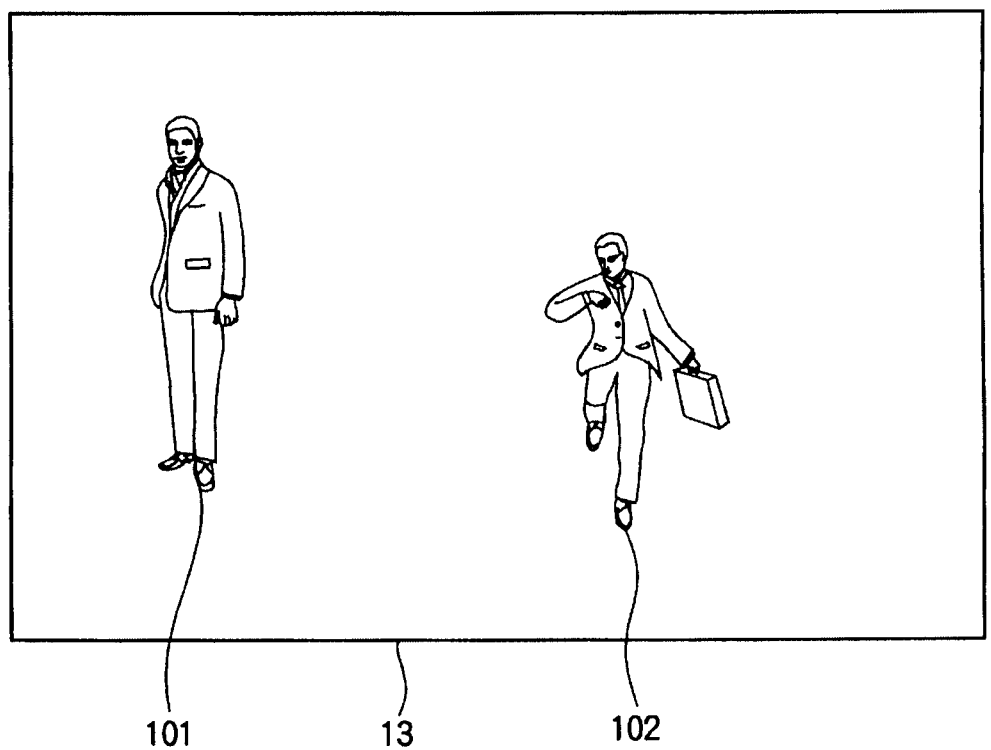
FIG. 19 is an example of the image displayed on the display apparatus.

Further, for example, as shown in FIG. 17, if the person 101 approaches the person 102 in an image, in other words, if the image frame 121 and the image frame 122 are overlapped, the image frame 201 as shown in FIG. 18 is generated, the image within the image frame 201 is enlarged and displayed, and the image as shown in FIG. 19 is displayed on the display apparatus 13.

In the case of the tracking zoom, and in the case where two processing data are reproduced simultaneously, the tracking zoom process is performed by the image frame of the size including the image frames respectively in two processing data. Therefore, the image frame is variably set to each frame. Further, although the description is made here by exemplifying two processing data (two image frames) reproduced simultaneously, the present invention may be applicable by performing the similar processing even if a plurality of processing data are simultaneously reproduced.

Figure 20:
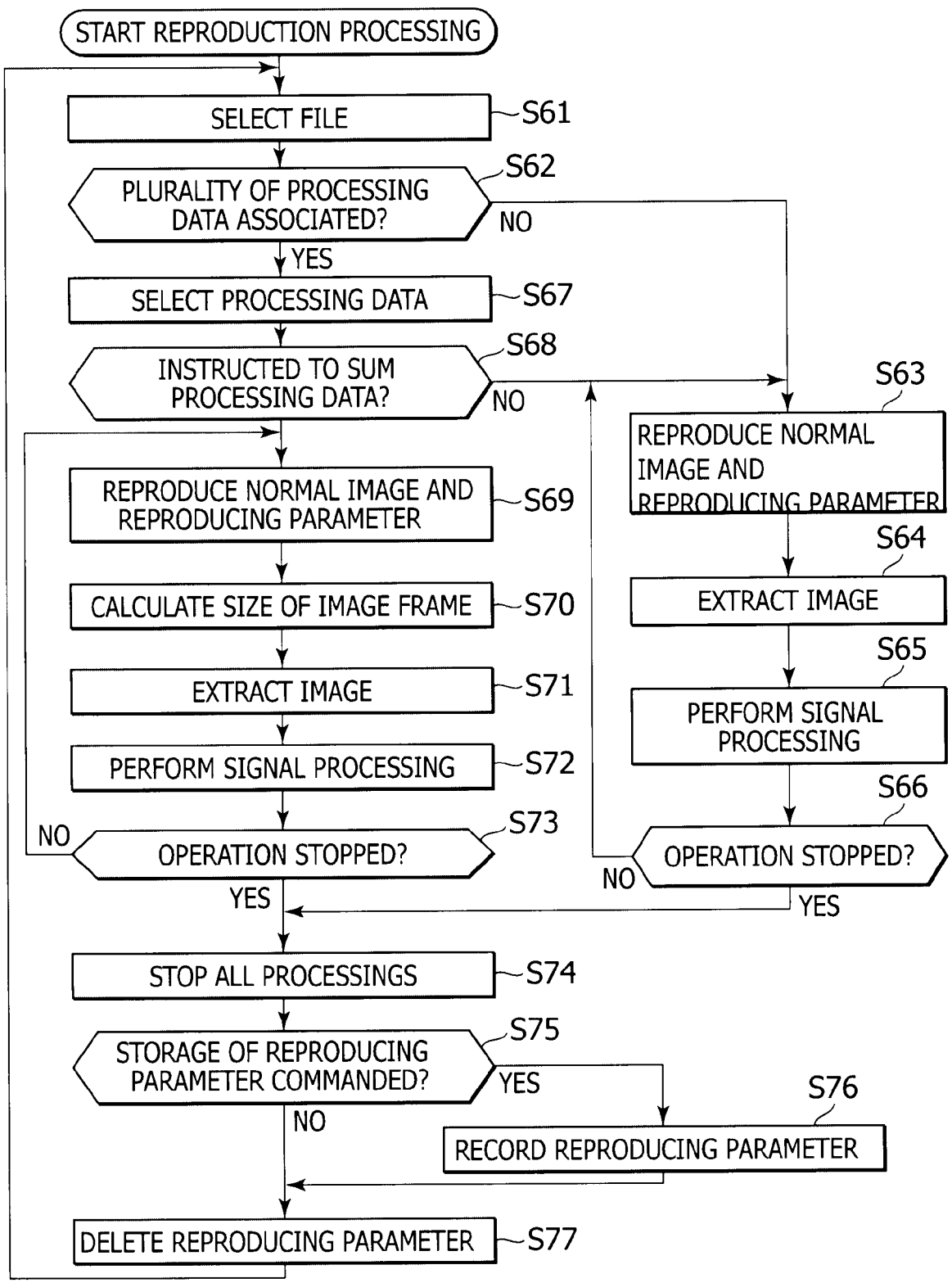
FIG. 20 is a flow chart for explaining operation of the reproduction apparatus.

Thus, with reference to a flow chart of FIG. 20, the processing of the reproduction apparatus 12 when a plurality of processing data are simultaneously reproduced and when the apparatus is in the reproduction mode, is described.

In step S61, the reproducing parameter processing unit 54 selects, from the file memory unit 58, a file used for reproducing the contents data 21 recorded on the recording medium 11. In this case, it is assumed that the file 151 as shown in FIG. 13 is stored in the file memory unit 58.

The user operates the operation unit 55 based on the list of the file names displayed on the display apparatus 13, thereby selecting one file name from the list of file names. Then, in step S61, the reproducing parameter processing unit 54 selects the file 151 specified by the file name as the file 151 used for reproducing the image.

In step S62, the reproducing parameter processing unit 54 reads the reproducing parameter 160 included in the file 151 stored in the file memory unit 58. The reproducing parameter processing unit 54 determines whether the reproducing parameter 160 including a plurality of processing data among the read reproducing parameters 160 exists. In the case of the file 151 as shown in FIG. 13, for example, the reproducing parameter 160-1 includes the processing datum 171-1 and the processing datum 172-2, and therefore it is determined in step S62 that a plurality of processing data are included (plurality of processing data are relevant with one synchronizing feature 161).

For example, as shown in FIG. 2, only the processing datum 32-1 among the reproducing parameters included in the file 22 is included in the reproducing parameter 30-1. While, the processing datum 32-2 and the processing datum 32-3 may be included in the reproducing parameter 30-2. Since the reproducing parameter is generated per each frame, and since the parameter is generated only for the edited frame, it is possible that the reproducing parameter 30-1 including one processing datum 32-1, and the reproducing parameter 30-2 including two processing datum 32-2 and 32-3 exist in one file 22 as shown in FIG. 2.

Therefore, when performing the processing of step S62, the reproducing parameter processing unit 54 does not determine only by referring to the top reproducing parameter 160, but determine with reference to the plurality of reproducing parameters 160. Alternatively, the determination in step S62 may be performed by providing the file 151 with a flag indicative of whether a file includes a plurality of processing data and referring to the flag.

In step S62, if it is determined that the plurality of processing data are not related with one synchronizing feature, the process moves to step S63. In this case, since it is determined that only one processing datum is associated with one synchronizing feature, the case is similar with the processing in the reproduction mode which is described with reference to the flow chart of FIG. 5 (steps S22 to S26), thus the description thereof is omitted here.

In step S62, if it is determined that the plurality of processing data are related with one synchronizing feature, the process advances to step S67. The processing data are selected in step S67. This selection of the processing data can be carried out by way of a similar process at step S61 in which the file is selected, for example.

In step S67, when the processing data are selected, the process moves to step S68. It is determined in step S68 whether sum of the selected processing data is commanded. When the sum the selected processing data is commanded, it means that the plurality of processing data are selected by the processing of step S67. When the sum of the selected processing data is not commanded, it means that one processing datum is selected by the processing of step S67.

In step S68, if it is determined that the sum of the processing data is not commanded, in other words, when it is determined that one processing datum is selected, the process advances to step S63, and the subsequent processing is performed.

On the other hand, in step S68, if it is determined that the sum of the processing data is commanded, the process moves to step S69. In step S69, the reproduction of the normal image and the reproducing parameter is started. In other words, the reproduction of the contents data 21 recorded on the recording medium 11 and the file 151 stored in the file memory unit 58 are started. Thus, the contents data 21 are reproduced (read) from the recording medium 11, the contents data 21 are supplied to the image extraction unit 52, and the file 151 (reproducing parameter 160 included in file 151) is supplied from the file memory unit 58 to the reproducing parameter processing unit 54.

Here, as described above, the reproducing parameter 30 may exist per each frame. The reproduction of the normal image is started with the earliest (in terms of time) frame where the reproducing parameter 160 exists, unless particularly specified.

The reproducing parameter processing unit 54 starts reproduction of the reproducing parameter 160 included in the file 151. Thus, the reproducing parameter 160 starts to be supplied from the record and reproduction unit 51. Further, the reproducing parameter processing unit 54 supplies the processing data operation unit 57 with the processing data 171 and the processing data 172 which are included in the read reproducing parameter 160.

In step S70, the processing data operation unit 57 calculates a size of the image frame by using the processing data 171 and the processing data 172. In other words, for example, the image frame 201 of FIG. 15 is set. In the example as described with reference to FIG. 15, the image frame 201 is set as the image frame including the image frame 121 and the image frame 122 (FIG. 14).

It is possible to find the position and size of the image frame 201 by extracting the endmost coordinates (four in total) from the coordinates (eight in total) at the respective vertices (corners) of the image frame 121 and the image frame 122, for example. The data regarding the coordinates are included in the processing data 171 or the processing data 172.

When the image frame is set, the size (aspect ratio) of the image frame of the display apparatus 13 is taken into consideration.

In step S70, when the image frame is set, an image is extracted from the normal image with the image frame in step S71. The normal image is supplied from the record and reproduction unit 51 to the image extraction unit 52 per a frame basis, for example. By assuming the frame of the normal image supplied from the record and reproduction unit 51 to be a frame of interest, the image extraction unit 52 sequentially extracts the extraction image from the frame of interest with a size of the image frame which is calculated in the processing data calculation unit 57 and supplied through the reproducing parameter processing unit 54, and supplies the image to the signal processing unit 53.

In step S72, the signal processing unit 53 starts the signal processing based on the reproducing parameter (correspondence parameter) supplied from the reproducing parameter processing unit 54, with respect to the extraction image (frame) supplied from the image extraction unit 52.

In step S73, the reproducing parameter processing unit 54 determines whether the operation unit 55 is operated by the user such that the reproduction is stopped (stop operation). In step S73, if it is determined that the stop operation is not performed, the process returns to step S69. Hereafter, by repeating the similar processing, the user is provided with an edit result when a plurality of edits are combined.

In step S73, if it is determined that the stop operation is performed, the process advances to step S74, and the reproducing parameter processing unit 54 controls the record and reproduction unit 51, the image extraction unit 52, the signal processing unit 53, and the processing data operation unit 57, to stop the processes of reproducing the reproducing parameter, extracting the extraction image, processing the signal with respect to the extraction image, summing the processing data (calculating image frame), and the like.

Except that the data of the image frame are the data calculated in the processing data operation unit 57, the processes in steps S71 to S73 are basically similar with the processes in steps S64 to S66.

In step S75, the reproducing parameter processing unit 54 determines whether the parameter set which is a set of the reproducing parameters stored in the reproducing parameter memory unit 56 is to be newly stored (saved) in the file memory unit 58. In this case, the parameter set is the result from calculation by the processing data operation unit 57, and is a combination of the results of the plurality of edits.

In other words, by controlling the signal processing unit 53, the reproducing parameter processing unit 54 causes the display apparatus 13 to display an inquiry message asking whether the new parameter set should be saved. Upon waiting that the user operates the operation unit 55 with respect to the inquiry messages, whether the new parameter set stored in the reproducing parameter memory unit 56 is stored in the file memory unit 58 is determined.

In step S75, if it is determined that the new parameter set stored in the reproducing parameter memory unit 56 is stored in the file memory unit 58, in other words, if the user operates the operation unit 55 with respect to the inquiry message so that the new parameter set may be stored, the process moves to step S76. The reproducing parameter processing unit 54 reads the new parameter set stored in the reproducing parameter memory unit 56, and stores the new parameter set in the file memory unit 58.

Further, in step S75, if it is determined that the new parameter set stored in the reproducing parameter memory unit 56 is not stored in the file memory unit 58, in other words, if the user operates the operation unit 55 with respect to the inquiry message so that the new parameter set may not be stored, step S76 is skipped and the process advances to step S77. The reproducing parameter processing unit 54 deletes (eliminates) the new parameter set stored in the reproducing parameter memory unit 56, the process returns to step S61, and the similar processing is repeated hereafter.

As described above, since the extraction image is extracted from the normal image with the image frame based on two processing data, the user can easily confirm results tracking zoom processes separately performed are combined. In other words, when the plurality of edits separately performed are combined, it becomes possible to easily confirm how the edit will be resulted.

In the embodiment, the example is described in the case where the tracking zoom is carried out at another image frame by summing the plurality of processing data when subjected to the edit which is referred to as the tracking zoom. Next, an example will be described in the case where the tracking zoom carried out at another image frame by subtracting the plurality of processing data when subjected to the edit which is referred to as the tracking zoom.

Figure 21:
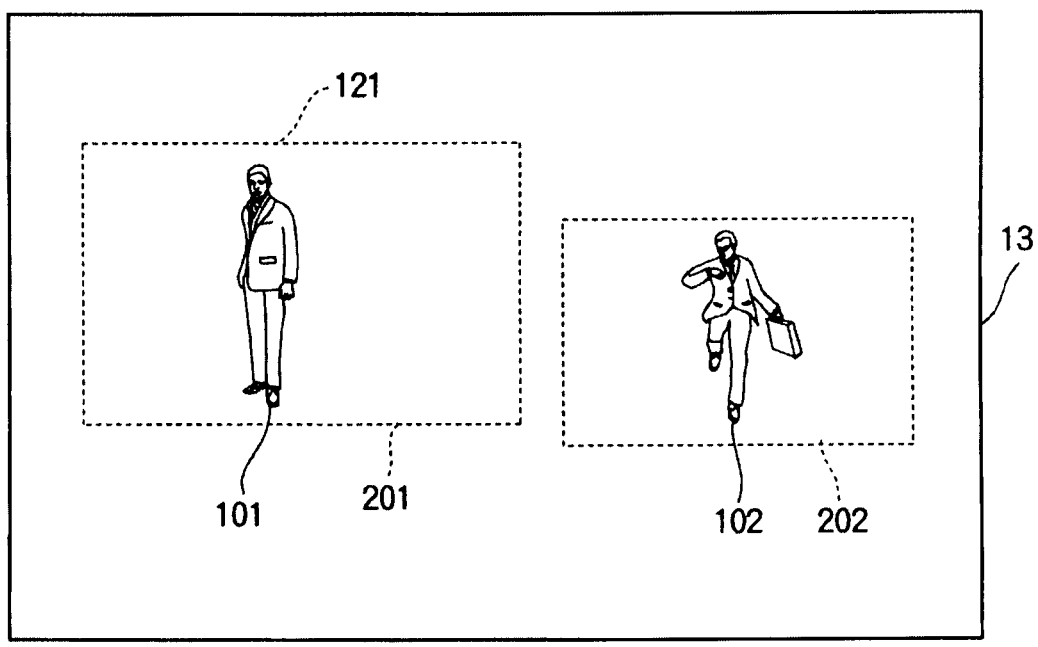
FIG. 21 is an example of the image displayed on the display apparatus.

FIG. 21 shows a situation where the image frame 201 and the image frame 202 are set in the image in which the person 101 and the person 102 are displayed and the tracking zoom process is performed in respective image frame, and apparently shows on one screen a situation where the two image frames are set. As the tracking zoom is performed by means of the image frame 201, the processing data are generated. As the tracking zoom is performed by means of the image frame 202, the processing data are generated. Here, the description is continued by assuming that the processing data generated as a result of performing the tracking zoom at the image frame 201 are the processing data 171 (FIG. 13) and the processing data generated as a result of performing the tracking zoom at the image frame 202 are the processing data 172 (FIG. 13).

Figure 22:
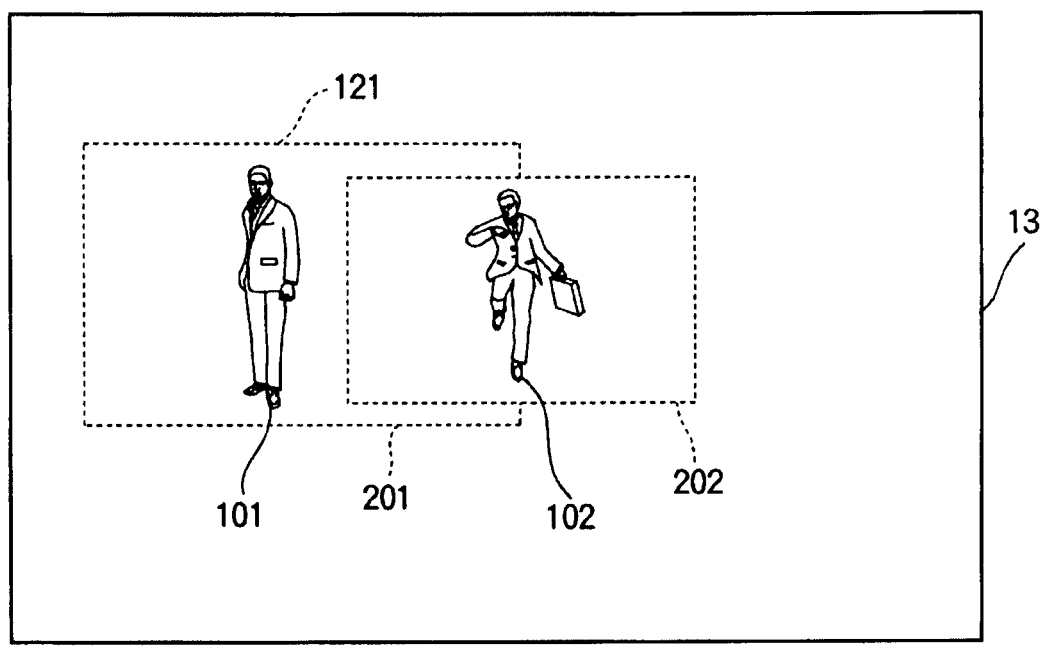
FIG. 22 is an example of the image displayed on the display apparatus.
Figure 23:
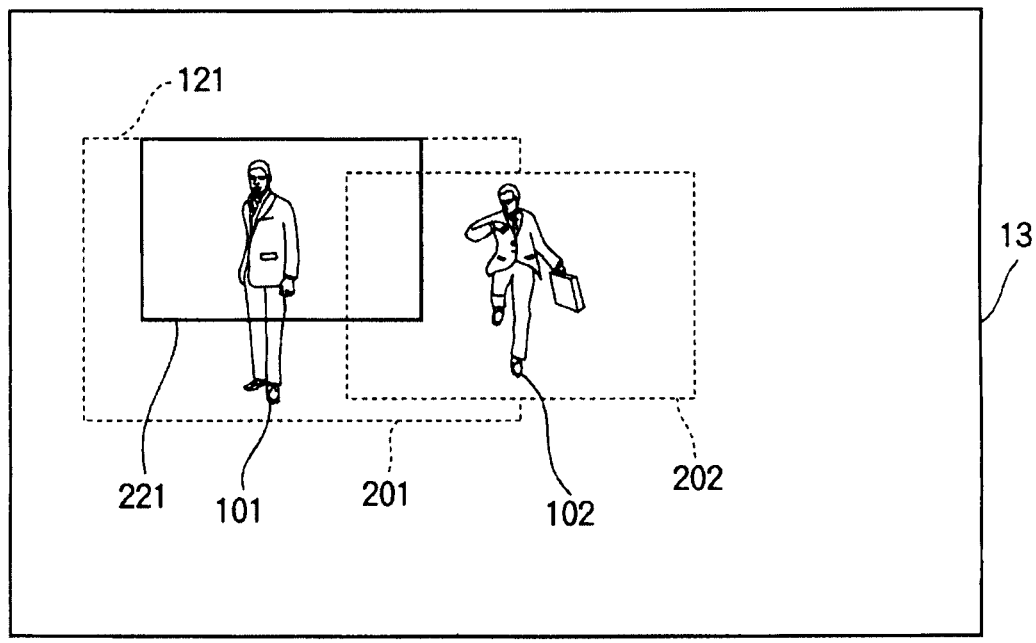
FIG. 23 is an example of the image displayed on the display apparatus.

When a positional relation between the person 101 and the person 102 shown in FIG. 21 becomes as one shown in FIG. 22, in other words, when the person 101 is not moving and the person 102 approaches the person 101, the image frame 201 and image frame 202 may overlap. As such, when it is set up as an image within one image frame is displayed by the user, and an image within the other image frame is not displayed, the image frame as shown in FIG. 23 is generated and the processing of the tracking zoom in the image frame is performed.

Here, it is set as the person 101 within the image frame 201 is displayed and the person 102 within the image frame 202 is not displayed. If the image frame 202 overlaps the image frame 201 under such a setup, an image frame 221 is set from the image frame 201 with the image frame 202 excluded. That is, the image frame 221 which is smaller than the image frame 201, but does not include the image frame 202, is set. In other words, the image frame in which the image frame 202 is subtracted from the image frame 201 is set as the new image frame 221. Further, since a new aspect ratio of the new image frame 221 needs to be the same aspect ratio of the image frame of the display apparatus 13, as similar with other image frames, the image frame in which a part of the person 101 is displayed as shown in FIG. 23 may be set.

Thus, in such a setup, when the processing data 171 regarding the person 101 and the processing data 172 regarding the person 102 are simultaneously reproduced, only the person 101 is displayed on the display apparatus 13. Even if the person 102 approaches the person 101 as shown in FIG. 22, the display is performed such that the image frame is changed such that the person 102 is not displayed. Consequently, only the person 101 is displayed on the display apparatus 13. Thus, by employing the present invention, it becomes possible to display only a favorite image out of a plurality of images.

Next, the processing with respect to such subtraction of the processing data is described. The processing when displaying the image based on desired processing data among the plurality of processing data, and not displaying the image based on other processing data, is carried out based on a flow chart as shown in FIG. 24.

Figure 24:
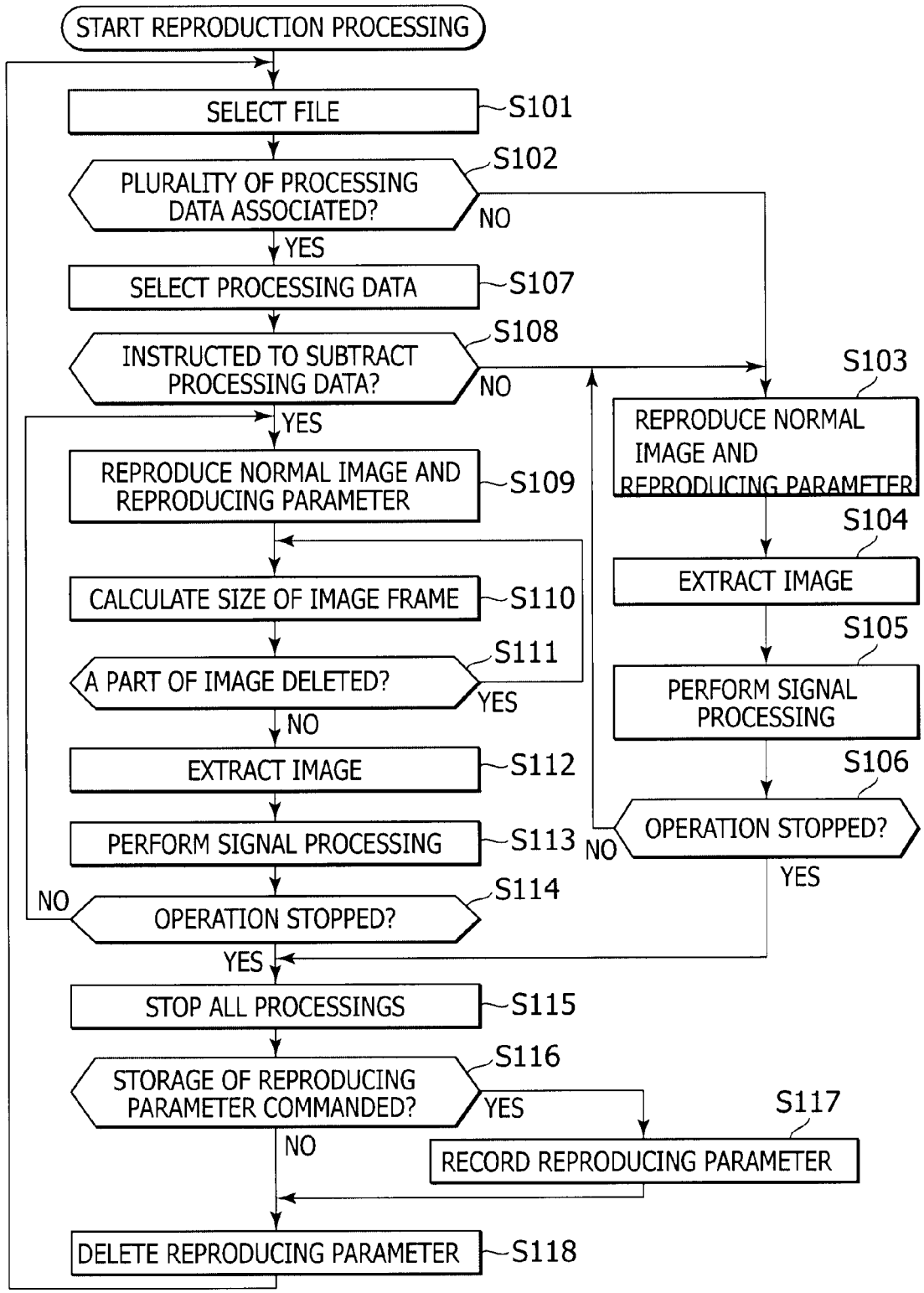
FIG. 24 is a flow chart for explaining operation of the reproduction apparatus.

The processing of the flow chart shown in FIG. 24 is basically similar with the processing of the flow chart shown in FIG. 20. In other words, when reproducing the plurality of processing data, the subtraction process is carried out, basically as similar with the processing when performing the summing process. Here, only the processing different from that in the flow chart as shown in FIG. 20 is described.

In performing the subtraction process when reproducing the plurality of processing data, it is determined in step S108 whether subtraction of the processing data is commanded. The user selects the image to be displayed and the image not to be displayed from the plurality of processing data. The processing data are chosen in accordance with the selection. Even if the user only selects the image to be displayed, in other words, even if an image not to be displayed is not selected, the unselected image may be set up as the image not to be displayed.

In the case of the example shown in FIG. 23, the image to be displayed is the person 101 in the image frame 201. As a result of the processing of the tracking zoom by means of the image frame 201, the generated processing data are the processing data 171 (FIG. 13). Therefore, the user selects the processing data 171 as the processing data corresponding to the image to be displayed. Further, in the case of the example as shown in FIG. 23, the image to be deleted is the person 102 in the image frame 202. As a result of the processing of the tracking zoom by means of the image frame 202, the generated processing data are the processing data 172 (FIG. 13). Therefore, the user selects the processing data 172 as the processing data corresponding to the image to be displayed.

In step S108, if it is determined that the subtraction of the processing data is commanded by the user, the process advances to step S109. In step S109, the contents data 21 are read from the recording medium 11, and the reproducing parameter 160 are read from the file memory unit 58. The size of the image frame is calculated in step S110. Calculation of the size of the image frame at step S110 is performed by subtracting the processing data set as the image not to be displayed from the processing data set as the image to be displayed by the user.

In this case, the calculation is carried out by means of the processing data 171 and the processing data 172 which are included in the read reproducing parameter 160. As described above with reference to FIG. 23, when the image frame 201 is set to the image frame which does not include the image frame 202, the data regarding the image frame 201 included in the processing data 171 and the data regarding the image frame 202 included in the processing data 172 are used to set the image frame 221.

In step S110, when the size of the image frame is calculated, it is determined whether a part of the image set by the user to be displayed at the set-up image frame is deleted in step S111. For example, again with reference to FIG. 23, when the image frame 202 overlaps with the person 101, the image within the image frame 202 is set so as not to be displayed. Therefore, a part or whole part of the person 101 that is set up to be displayed may not be displayed.

It is also possible to set such that a part of the image intended to be displayed may not be displayed. In such a setup, it is possible to omit the processing of step S111. However, if it is set to a situation where non-display of a part of the image intended to be displayed is not allowed, in other words, a situation where image intended to be displayed is wholly displayed, it is determined in step S111 whether the size of the image frame causes even a part of the image set up to be displayed to a non-displayed state.

In step S111, if it is determined that a part of the image is deleted, the process returns to step S110 and the size of the image frame is calculated again. At this time, the size of the image frame for displaying the whole parts of image that is commanded to be displayed is calculated. The processing of step S111 is performed for the image frame set again. In step S111, if it is determined that the image frame does not cause a part of the image to be deleted, the process advances to step S112.

It should be noted that, the image frame is set by taking into consideration of the size (aspect ratio) of the image frame of the display apparatus 13.

Since the processing in step S112 and steps subsequent thereto is similar to the processing in step S71 in the flow chart of FIG. 20, the description thereof is omitted here.

As described above, since the extraction image is extracted from the normal image by the image frame based on two processing data, the user can easily confirm results when the tracking zoom processes separately performed are combined. In other words, when the plurality of edits separately performed are combined, it becomes possible to easily confirm how edits will be resulted.

Thus, according to embodiments of the present invention, it is possible to perform the plurality of edits separately, and to easily combine the plurality of edits which are performed separately. Therefore, the user can easily obtain the image subjected to the new edit from the plurality of edits which are separately performed.

[Recording Medium]

A series of processings described above may be performed by hardware, and may also be performed by software. When a series of processings are performed by software, programs which constitute the software are installed from a program recording medium to a computer built in dedicated hardware or in a general-purpose personal computer, or the like, for example, which can carry out various types of functions by installing various types of programs.

Figure 25:
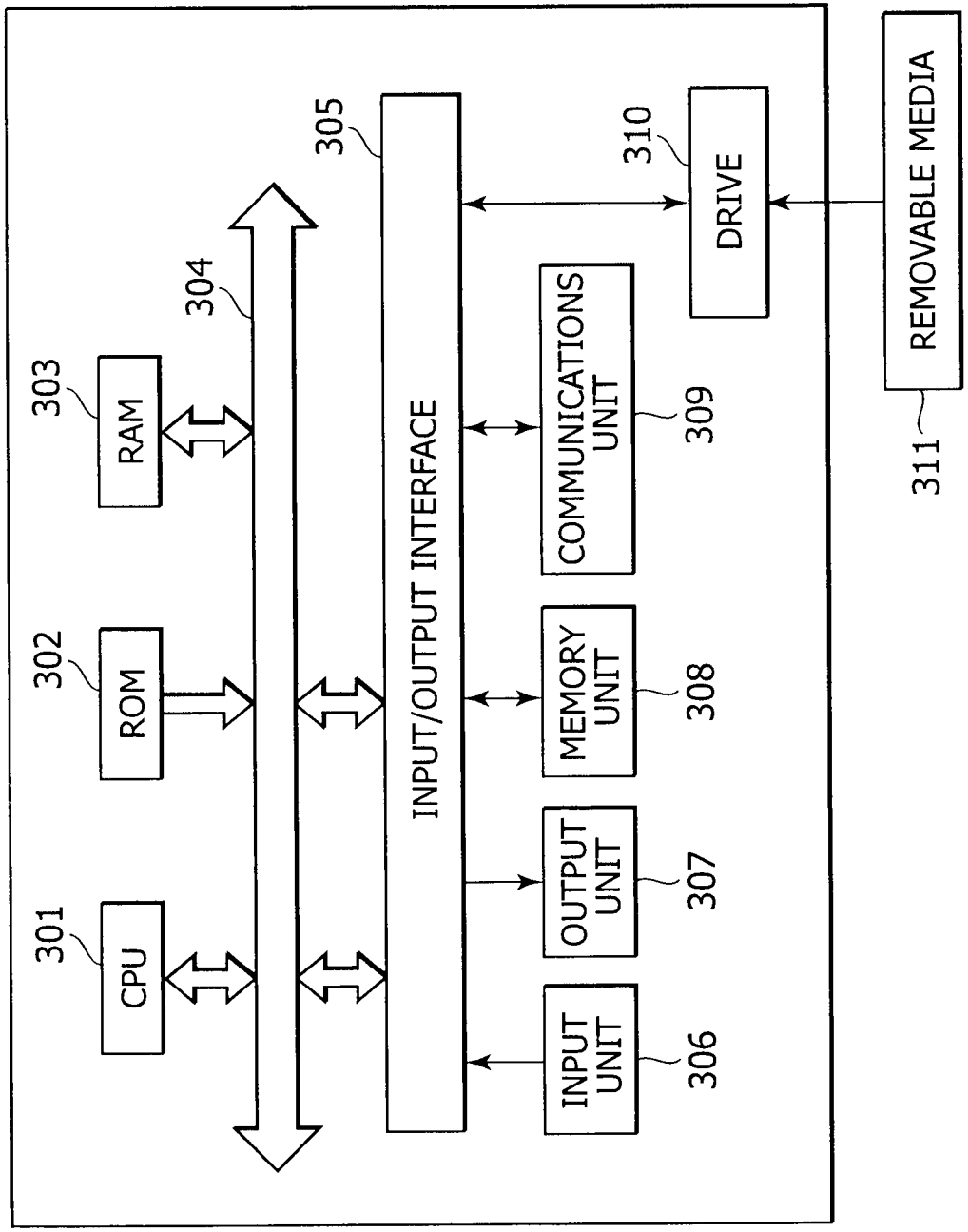
FIG. 25 is a diagram for explaining a recording medium.

FIG. 25 is a block diagram showing an example of a structure of hardware of a personal computer which performs the series of processings as described above by a program.

In the computer, CPU (Central Processing Unit) 301, ROM (Read Only Memory) 302, and RAM (Random Access Memory) 303 are mutually connected by a bus 304.

An input/output interface 305 is further connected to the bus 304. The input/output interface 305 is connected to an input unit 306 constituted by a keyboard, a mouse, a microphone, and the like, an output unit 307 constituted by a display, a speaker, and the like, a memory unit 308 constituted by a hard disk, a non-volatile memory, and the like, a communications unit 309 constituted by a network interface, or the like, and a drive 310 for driving removable media 311, such as a magnetic disk, an optical disc, a magneto-optical disc, or a semiconductor memory, and the like.

In the thus configured computer, CPU 301 loads the program stored in the memory unit 308 to RAM 303, via the input/output interface 305 and the bus 304, for execution of programs.

The programs to be executed by the computer (CPU 301) is recorded on the removable media 311 which are package media constituted by a magnetic disk (including flexible disk), optical discs (CD-ROM (Compact Disc-Read Only Memory), DVD (Digital Versatile Disc), etc.), a magneto-optical disc, a semiconductor memory, or is provided through wired or wireless transmission media, such as a local area network, the internet, and digital satellite broadcasting.

Further, by mounting the removable media 311 to the drive 310, the program can be installed in the memory unit 308 via the input/output interface 305. Furthermore, the program can be received at the communications unit 309 through the wired or wireless transmission media, and can be installed in the memory unit 308. In addition, the program can be preinstalled in ROM 302 or the memory unit 308.

It should be noted that the program to be executed by the computer may be a program with which the processings are performed along the order of the description in the present specification, and may be a program with which the processings are performed at a timing when the processings are required, such as when it is called.

Further, in the present specification, "system" represents the whole apparatus constituted by a plurality of apparatuses.

It should be noted that embodiments of the present invention are not limited to the embodiments described above, and various modifications are allowed without departing from the gist of the present invention.

It should be understood by those skilled in the art that various modifications, combinations, sub-combinations and alterations may occur depending on design requirements and other factors insofar as they are within the scope of the appended claims or the equivalents thereof.

The present document contains subject matter related to Japanese Patent Application No. 2007-155938 filed in the Japanese Patent Office on Jun. 13, 2007, the entire content of which being incorporated herein by reference.

What is claimed is:

1. An information processing apparatus, comprising:
    a record and reproduction unit configured to load first content data having a plurality of image frames, each image frame being associated with a plurality of first edit commands;
    a reproduction control unit configured to control, for each image frame, reproduction of the plurality of first edit commands in order to reproduce an edit applied to each image frame;
    a generation unit configured to generate, for each image frame, a second edit command by combining the plurality of the first edit commands associated with a particular image frame and reproduced by the reproduction control unit, the combining of the plurality of the first edit commands further including reconciling respective conflicts between the plurality of the first edit commands;
    and an edit unit configured to, via a processor, edit each image frame based on the second edit command generated by the generation unit,
    and generate a second content data based on the editing from the second edit command to each image frame,
    wherein the first edit commands modify the respective image frame such that subject matter is displayed differently in the resulting respective image frame.

2. The information processing apparatus according to claim 1, wherein
    the plurality of first edit commands include at least extracting a predetermined area from one or more of the image frames, and
    the second edit command extracts an area including a plurality of areas from the particular image frame based on the plurality of first edit commands.

3. The information processing apparatus of claim 2, wherein the plurality of first edit commands further include extracting width and height information of the predetermined area.

4. The information processing apparatus according to claim 1, wherein
the plurality of first edit commands include extracting a predetermined area from one or more of the image frames, and
the second edit command extracts, from the particular image frame, a predetermined area among a plurality of areas based on the plurality of first edit commands while not extracting an object in other areas.

5. The information processing apparatus according to claim 1, wherein the generation unit generates
the second edit command by subtracting other first edit commands from a predetermined first edit command among the plurality of first edit commands.

6. The information processing apparatus of claim 5, wherein
the plurality of first edit commands include at least extracting a predetermined area from one or more of the first image frames, and
the second edit command extracts an area including a plurality of areas from the particular image frame based on the plurality of added first edit commands.

7. The information processing apparatus of claim 6, wherein
the plurality of first edit commands further includes extracting width and height information of the predetermined area, and
the edit unit edits the particular image frame based on the second edit command and the width and height information to generate the second content data.

8. The information processing apparatus of claim 1, wherein the plurality of first edit commands include zooming into a predetermined area from an image frame and extracting the predetermined area.

9. The information processing apparatus of claim 1, wherein the edit unit recreates edits to the first content data to generate the second content data such that the first content data is not edited.

10. The information processing apparatus of claim 1, wherein in response to the plurality of the first edit commands including two or more commands to extract overlapping areas, the generation unit is configured to reconcile the respective conflicts between the extractions of the overlapping areas and produce a single extracted area.

11. The information processing apparatus of claim 1, wherein in response to the plurality of the first edit commands including a first extracting edit command extracting a first area and a second extracting edit command extracting a second area, reconciling conflicts between the first and second extracting edit commands to address conflicts between the extractions.

12. The information processing apparatus of claim 11, wherein the reconciling of conflicts between the first and second extracting edit commands includes replacing the first and second extracting edit commands with a single extracting edit command that extracts an area including both the first area and the second area.

13. An information processing method implemented by an information processing apparatus, comprising:
loading first content data having a plurality of image frames, each image frame being associated with a plurality of first edit commands;
controlling, for each image frame, reproduction of the plurality of first edit commands in order to reproduce an edit applied to each image frame;
generating, for each image frame, a second edit command by combining the plurality of the reproduced first edit commands associated with a particular image frame,
the combining of the plurality of the first edit commands further including reconciling respective conflicts between the plurality of the first edit commands, the first edit commands modifying the respective image frame such that subject matter is displayed differently in the resulting respective image frame;
editing, via a processor, each image frame based on the generated second edit command;
and generating a second content data based on the editing from the second edit command to each image frame.

14. An information processing apparatus, comprising:
record and reproduction means for loading first content data having a plurality of image frames, each image frame being associated with a plurality of first edit commands;
reproduction control means for controlling, for each image frame, reproduction of the plurality of first edit commands in order to recreate an edit applied to each image frame;
generation means for generating, for each image frame, a second edit command by combining the plurality of the reproduced first edit commands associated with a particular image frame, the combining of the plurality of the first edit commands further including reconciling respective conflicts between the plurality of the first edit commands,
the first edit commands modify the respective image frame such that subject matter is displayed differently in the resulting respective image frame;
and edit means for editing each image frame based on the generated second edit command, to generate a second content data based on the editing from the second edit command to each image frame.

15. A non-transitory computer-readable medium storing computer-readable instructions thereon which when executed by an information processing apparatus cause the information processing apparatus to perform a method comprising:
loading first content data having a plurality of image frames, each image frame being associated with a plurality of first edit commands;
controlling, for each image frame, reproduction of the plurality of first edit commands in order to recreate an edit applied to each image frame;
generating, for each image frame, a second edit command by combining the plurality of the reproduced first edit commands associated with a particular image, the combining of the plurality of the first edit commands further including reconciling respective conflicts between the plurality of the first edit commands,
the first edit commands modifying the respective image frame such that subject matter is displayed differently in the resulting respective image frame;
editing each image frame based on the generated second edit command;
and generating a second content data based on the editing from the second edit command to each image frame.

* * * * *